United States Patent
Sakata et al.

(10) Patent No.: US 7,917,033 B2
(45) Date of Patent: Mar. 29, 2011

(54) WAVELENGTH-MULTIPLEXING OPTICAL TRANSMISSION SYSTEM AND WAVELENGTH-MULTIPLEXING OPTICAL TRANSMISSION METHOD

(75) Inventors: Tomoyuki Sakata, Fukuoka (JP); Akira Yamamoto, Fukuoka (JP); Koji Bato, Fukuoka (JP); Kouji Tanonaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 737 days.

(21) Appl. No.: 11/878,301

(22) Filed: Jul. 23, 2007

(65) Prior Publication Data
US 2008/0025727 A1    Jan. 31, 2008

(30) Foreign Application Priority Data
Jul. 25, 2006    (JP) ................................ 2006-202266

(51) Int. Cl.
*H04J 14/02*    (2006.01)
(52) U.S. Cl. ....................................................... 398/79
(58) Field of Classification Search .................... 398/79
See application file for complete search history.

(56) References Cited

U.S. PATENT DOCUMENTS

| | | | |
|---|---|---|---|
| 7,471,899 B2 * | 12/2008 | Kim et al. | 398/69 |
| 7,502,563 B2 * | 3/2009 | Nozue et al. | 398/69 |
| 2006/0104640 A1 * | 5/2006 | Kunimatsu et al. | 398/79 |
| 2007/0077072 A1 | 4/2007 | Kunimatsu et al. | |

FOREIGN PATENT DOCUMENTS

| | | |
|---|---|---|
| JP | 08-293853 | 11/1996 |
| JP | 09-051324 | 2/1997 |
| JP | 2004-274113 | 9/2004 |
| JP | 2005-277686 | 10/2005 |
| JP | 2005-286736 | 10/2005 |
| JP | 2007-097067 A | 4/2007 |
| JP | 2007-097068 | 4/2007 |

OTHER PUBLICATIONS

"Japanese Office Action" mailed by JPO and corresponding to Japanese application No. 2006-202266 on Sep. 21, 2010, with English translation.

* cited by examiner

*Primary Examiner* — Shi K Li
(74) *Attorney, Agent, or Firm* — Fujitsu Patent Center

(57) ABSTRACT

A wavelength-multiplexing optical transmission apparatus includes an optical-wavelength-information storing unit that stores optical wavelength information on an optical wavelength of an optical signal to be output from a transponder, and an optical-wavelength-information transmitting unit that transmits the stored optical wavelength information to the transponder via a connection cable. The transponder includes an optical-wavelength control unit that controls an optical wavelength of an optical signal to be input to a wavelength multiplexing unit based on the optical wavelength information received from the optical-wavelength-information transmitting unit.

5 Claims, 20 Drawing Sheets

FIG.3

| OPTICAL WAVELENGTH INFORMATION | CODE |
| --- | --- |
| $\lambda 1$ | 01(h) |
| $\lambda 2$ | 02(h) |
| $\lambda 3$ | 03(h) |
| $\lambda 4$ | 04(h) |
| ⋮ | ⋮ |

FIG.9

| OPTICAL WAVELENGTH INFORMATION | NUMBER OF RECEIVED OPTICAL PULSES |
|---|---|
| λ1 | 1pulse/sec |
| λ2 | 2pulse/sec |
| λ3 | 3pulse/sec |
| λ4 | 4pulse/sec |
| ⋮ | ⋮ |

FIG.14

| OPTICAL WAVELENGTH INFORMATION | MODULATION FREQUENCY |
|---|---|
| $\lambda 1$ | 1Hz |
| $\lambda 2$ | 2Hz |
| $\lambda 3$ | 3Hz |
| $\lambda 4$ | 4Hz |
| ⋮ | ⋮ |

WAVELENGTH-MULTIPLEXING OPTICAL TRANSMISSION SYSTEM AND WAVELENGTH-MULTIPLEXING OPTICAL TRANSMISSION METHOD

BACKGROUND OF THE INVENTION

1. Field of the Invention

The present invention relates to a wavelength-multiplexing optical transmission system and a wavelength-multiplexing optical transmission method.

2. Description of the Related Art

In the field of optical communication networks, a wavelength division multiplexing (WDM) system has been mainstreamed nowadays. In the WDM system, a plurality of optical signals with different wavelengths is multiplexed into a single optical fiber cable to increase a transmission capacity of the optical fiber cable. To establish the WDM system, a transponder is required with a capability of converting an optical signal with a broadband wavelength into an optical signal with a narrowband wavelength. With the increase of the number of multiwavelength transmissions in recent years, the transponder needs to respond to multiple wavelengths. Therefore, a tunable transponder capable of tuning the wavelength is generally used in the WDM system.

To cause the tunable transponder to output an optical signal with a specified optical wavelength, it is necessary to set the optical wavelength on the tunable transponder. In a conventional technology, as shown in FIG. 18, the wavelength is manually set by an operator. Specifically, the operator first confirms information on a physical connection between a transponder and a wavelength multiplexing unit or a wavelength demultiplexing unit, which are included in a wavelength-multiplexing optical transmission apparatus. Particularly, the operator confirms information on connections between the transponder and each port of the wavelength multiplexing unit or each port of the wavelength demultiplexing unit, and then manually sets the wavelength on the wavelength-multiplexing optical transmission apparatus via a control terminal. The operator's instruction for setting the wavelength is transmitted from the control terminal to a control unit of the wavelength-multiplexing optical transmission apparatus. The ports of the wavelength multiplexing unit and the wavelength demultiplexing unit are configured to respond to specified optical wavelengths, respectively. Therefore, information on the optical wavelengths corresponding to the ports is also manually set via the control terminal at the same time (see FIG. 18 (1)). Then, the control unit of the wavelength-multiplexing optical transmission apparatus informs a control unit of the transponder about the information on the optical wavelengths (see FIG. 18 (2)). Upon being informed the information, the control unit of the transponder sets the optical wavelengths on the transponder based on the information informed from the control unit of the wavelength-multiplexing optical transmission apparatus (see FIG. 18 (3)).

However, with the above method, a chance of causing an error is high because the setting process is performed manually. In addition, a workload on the operator disadvantageously increases because the operator needs to perform manually all the processes of confirming the information and setting the optical wavelength.

To solve the problems, Japanese Patent Application Laid-open No. 2004-274113 discloses a method of setting an optical wavelength on a transponder based on an intensity of a light output from the transponder. Furthermore, Japanese Patent Application Laid-open No. 2005-277686 discloses a method of setting an optical wavelength on a transponder by detecting a light output from the transponder.

The method disclosed in Japanese Patent Application Laid-open No. 2004-274113 is explained in detail below with reference to FIG. 19. The transponder sequentially outputs an optical signal to a wavelength-multiplexing optical transmission apparatus by changing an optical wavelength of the optical signal (see FIG. 19 (1)). When receiving the optical signal from the transponder, the wavelength-multiplexing optical transmission apparatus detects light intensities of optical signals before and after a band-pass filter, and calculates a difference value between detected light intensities (see FIG. 19 (2)). The above processes (1) and (2) are repeatedly performed by the transponder and the wavelength-multiplexing optical transmission apparatus, respectively. When the smallest difference value is obtained, the wavelength-multiplexing optical transmission apparatus determines that an optical signal with an optical wavelength appropriate to the band-pass filter is output from the transponder, and informs the transponder about the optical wavelength (see FIG. 19 (3)).

The method disclosed in Japanese Patent Application Laid-open No. 2005-277686 is explained in detail below with reference to FIG. 20. The transponder sequentially outputs an optical signal to a wavelength-multiplexing optical transmission apparatus by changing an optical wavelength of the optical signal (see FIG. 20 (1)). Upon receiving the optical signal via an optical multiplexer included in the wavelength-multiplexing optical transmission apparatus, the optical multiplexer outputs the optical signal to a photodiode included in the wavelength-multiplexing optical transmission apparatus. Then, the photodiode outputs a detection signal (an electrical current) corresponding to the received optical signal to a light-emitting diode included in the wavelength-multiplexing optical transmission apparatus (see FIG. 20 (2)). Upon receiving the detection signal, the light-emitting diode emits a light corresponding to the received detection signal. The emitted light becomes a feedback light to the transponder (see FIG. 20 (3)). The feedback light is detected by a photodiode included in the transponder. Then, the photodiode informs a wavelength control unit included in the transponder about a detection signal corresponding to the feedback light (see FIG. 20 (4)). Each port of the optical multiplexer is configured to pass only an optical signal with a specified wavelength therethrough. Therefore, the time in which the photodiode included in the wavelength-multiplexing optical transmission apparatus receives a light indicates the time in which the transponder outputs an optical signal with a wavelength appropriate to a port of the optical multiplexer. In other words, the time in which the transponder detects a feedback light indicates the time in which the transponder outputs an optical signal with a wavelength appropriate to a port of the optical multiplexer.

In the above conventional technologies, however, it is not possible to set an optical wavelength stably. For example, if there is an abnormality in the wavelength-multiplexing optical transmission apparatus, it may not be possible to detect a light intensity or a light itself precisely.

In the method disclosed in Japanese Patent Application Laid-open No. 2004-274113, an optical wavelength is set on the transponder based on an intensity of a light output from the transponder. Therefore, in case the wavelength-multiplexing optical transmission apparatus has a trouble (for example, because of a defect in the band-pass filter), an intensity of a light cannot be detected precisely, and thus an optical wavelength cannot be set on the transponder stably. Similarly, in the method disclosed in Japanese Patent Application Laid-open No. 2005-277686, an optical wavelength is set on the transponder upon detection of a light output from the transponder. Therefore, in case the wavelength-multiplexing optical transmission apparatus has a trouble (for example, because of a defect in a port of the optical multiplexer), a light itself cannot be detected, and thus an optical wavelength cannot be set on the transponder stably.

SUMMARY OF THE INVENTION

It is an object of the present invention to at least partially solve the problems in the conventional technology.

A wavelength-multiplexing optical transmission system according to one aspect of the present invention includes a transponder that outputs an optical signal with a predetermined optical wavelength; a wavelength-multiplexing optical transmission apparatus including a wavelength multiplexing unit that multiplexes wavelengths of optical signals input from the transponder into an optical signal, and a wavelength demultiplexing unit that demultiplexes wavelengths of a multiplexed optical signal and outputs demultiplexed optical signals to the transponder; and a connection cable for connecting the transponder and the wavelength-multiplexing optical transmission apparatus. The wavelength-multiplexing optical transmission apparatus further includes an optical-wavelength-information storing unit that stores therein optical wavelength information on an optical wavelength of an optical signal to be output from the transponder, and an optical-wavelength-information transmitting unit that transmits the optical wavelength information stored in the optical-wavelength-information storing unit to the transponder via the connection cable. The transponder includes an optical-wavelength control unit that controls an optical wavelength of an optical signal to be input to the wavelength multiplexing unit based on the optical wavelength information received from the optical-wavelength-information transmitting unit.

A wavelength-multiplexing optical transmission method according to another aspect of the present invention is for a wavelength-multiplexing optical transmission system that includes a transponder that outputs an optical signal with a predetermined optical wavelength, a wavelength-multiplexing optical transmission apparatus including a wavelength multiplexing unit that multiplexes wavelengths of optical signals input from the transponder into an optical signal and a wavelength demultiplexing unit that demultiplexes wavelengths of a multiplexed optical signal and outputs demultiplexed optical signals to the transponder, and a connection cable for connecting the transponder and the wavelength-multiplexing optical transmission apparatus. The wavelength-multiplexing optical transmission method includes optical-wavelength-information storing including the wavelength-multiplexing optical transmission apparatus storing optical wavelength information on an optical wavelength of an optical signal to be output from the transponder; optical-wavelength-information transmitting including the wavelength-multiplexing optical transmission-apparatus transmitting the optical wavelength information stored at the optical-wavelength-information storing to the transponder via the connection cable; and controlling including the transponder controlling an optical wavelength of an optical signal to be input to the wavelength multiplexing unit based on the optical wavelength information transmitted at the optical-wavelength-information transmitting.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of optical wavelength information stored in an optical-wavelength-information storing unit shown in FIG. 2;

FIG. 9 is an example of a conversion table stored in a conversion-table storing unit shown in FIG. 8;

FIG. 14 is an example of a conversion table stored in a conversion-table storing unit shown in FIG. 13;

DETAILED DESCRIPTION OF THE PREFERRED EMBODIMENTS

Figure 1:
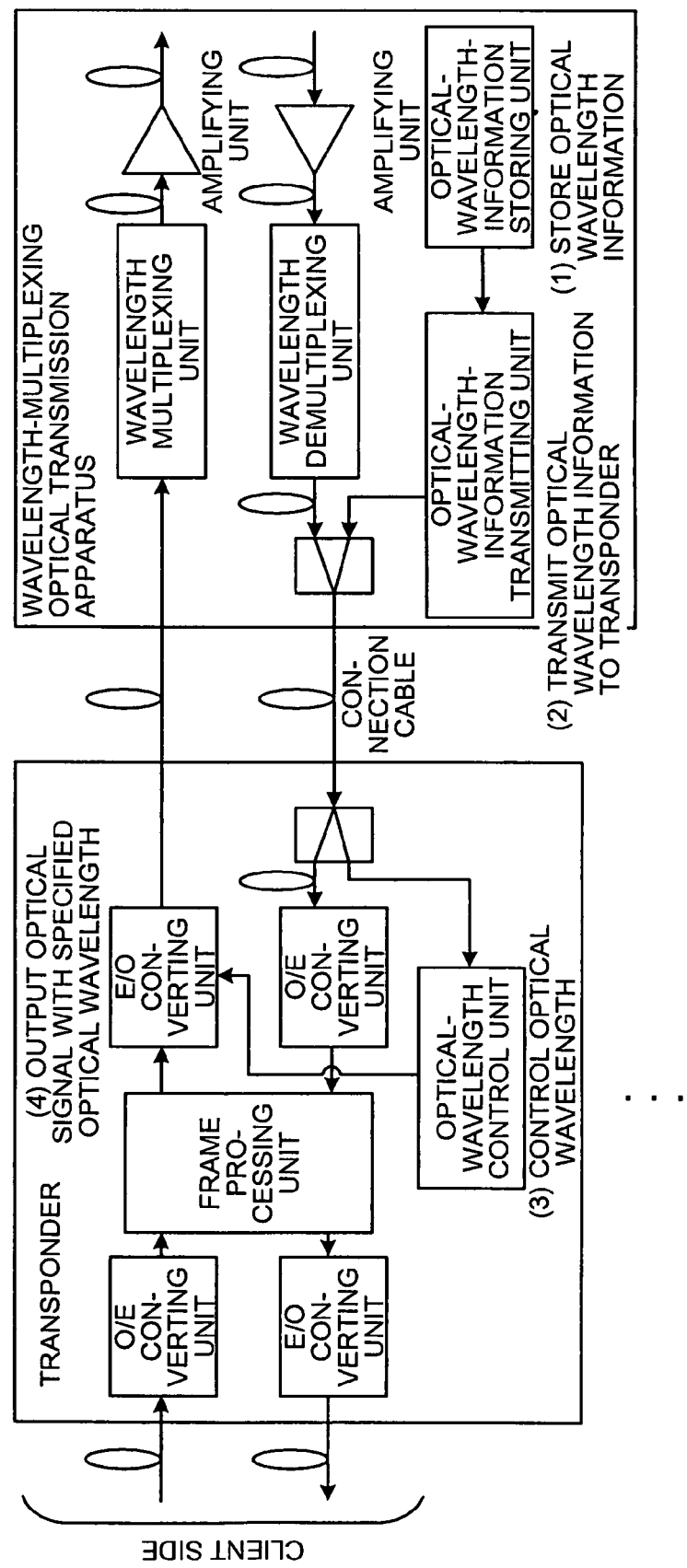
FIG. 1 is a simplified block diagram of a wavelength-multiplexing optical transmission system according to a first embodiment of the present invention.

Exemplary embodiments of the present invention are explained in detail below with reference to the accompanying drawings.

First, main terminologies used in the embodiments are explained below. A "wavelength-multiplexing optical transmission system" is a system for optical communications, and more specifically, for establishing a WDM system in which a plurality of optical signals with different wavelengths is multiplexed into a single optical fiber cable. In the embodiments, the wavelength-multiplexing optical transmission system includes one or more "transponder(s)" and a "wavelength-multiplexing optical transmission apparatus". A plurality of the wavelength-multiplexing optical transmission systems, which employs the WDM system, is linked via a network, and thereby optically communicating among the systems via the network.

The transponder converts an optical signal with a broadband wavelength, which is input from the client side terminal, into an optical signal with a narrowband wavelength, and outputs the converted optical signal to the wavelength-multiplexing optical transmission apparatus. The transponder generally includes a tunable laser diode (LD) because the transponder is required to be tunable in accordance with the increase of the number of optical wavelengths subjected to be multiplexed in the WDM system in recent years. The tunable transponder can output an optical signal with a specified optical wavelength that is set by an external source.

When the wavelength-multiplexing optical transmission apparatus receives optical signals with narrowband wavelengths from the one or more transponder(s), the received optical signals are multiplexed into an optical signal by a wavelength multiplexing unit, which is included in the wavelength-multiplexing optical transmission apparatus, and then optically-amplified to raise an optical level of the optical signal to a certain optical level necessary for transmission. Then, the wavelength-multiplexing optical transmission apparatus outputs the optically-amplified optical signal to the network side terminal. On the other hand, when the wavelength-multiplexing optical transmission apparatus receives an optical signal from the network side terminal, the wavelength-multiplexing optical transmission apparatus optically-amplifies the received optical signal to raise an optical level of the optical signal because the optical level is dropped in the process of transmission. Then, the optically-amplified optical signal is demultiplexed by each of wavelengths by a wavelength demultiplexing unit, which is included in the wavelength-multiplexing optical transmission apparatus, and output to the one or more transponder(s).

Incidentally, a relation between the transponder and the wavelength-multiplexing optical transmission apparatus is explained below. Each of ports of the wavelength multiplexing unit is configured to respond to a specified optical wavelength only, and also each of ports of the wavelength demultiplexing unit is configured to respond to a specified optical wavelength only. Each of the transponders outputs an optical signal with a specified optical wavelength. Therefore, the each of the transponders can be identified, as a set, with a specified port of the wavelength multiplexing unit and a specified port of the wavelength demultiplexing unit, which respectively respond to a specified optical wavelength of an optical signal output from each of the transponders. Consequently, the each of the transponders is connected, as a set, to the specified port of the wavelength multiplexing unit via a connection cable, and also connected, as a set, to the specified port of the wavelength demultiplexing unit via a connection cable.

Therefore, an optical signal with a specified optical wavelength output from one of the transponders is input to a specified port of the wavelength multiplexing unit, which responds to the specified optical wavelength only. Also, an optical signal with a specified optical wavelength output from a specified port of the wavelength demultiplexing unit, which responds to the specified optical wavelength only is input to the one of the transponders. Thus, it is possible to set an appropriate optical wavelength on the tunable transponder.

An outline of a wavelength-multiplexing optical transmission system according to a first embodiment of the present invention is described below with reference to FIG. 1. FIG. 1 is a simplified block diagram of the wavelength-multiplexing optical transmission system according to the first embodiment.

The wavelength-multiplexing optical transmission system according to the first embodiment includes a transponder, a wavelength-multiplexing optical transmission apparatus, and a connection cable. The transponder outputs an optical signal with a specified optical wavelength to the wavelength-multiplexing optical transmission apparatus. The wavelength-multiplexing optical transmission apparatus includes a wavelength multiplexing unit, a wavelength demultiplexing unit, an optical-wavelength-information transmitting unit, and an optical-wavelength-information storing unit. The wavelength multiplexing unit multiplexes optical signals with different optical wavelengths received from the transponder into an optical signal. The wavelength demultiplexing unit demultiplexes a multiplexed optical signal by each of the optical wavelengths, and outputs optical signals with each of the optical wavelengths to the transponder. The transponder and the wavelength-multiplexing optical transmission apparatus are connected to each other by the connection cable.

The optical-wavelength-information storing unit stores therein optical wavelength information on an optical wavelength of an optical signal input from the transponder (see FIG. 1-(1)).

The optical-wavelength-information transmitting unit transmits the optical wavelength information stored in the optical-wavelength-information storing unit to the transponder via the connection cable (see FIG. 1-(2)). Specifically, the optical-wavelength-information transmitting unit converts the optical wavelength information into an optical signal with a specified optical wavelength that is not used in main signals, and transmits the optical signal with the specified optical wavelength to the transponder.

An optical-wavelength control unit included in the transponder controls an optical wavelength of an optical signal to be input to the wavelength multiplexing unit based on the optical-wavelength-information transmitted from the optical-wavelength-information transmitting unit (see FIG. 1-(3)). Specifically, the optical-wavelength control unit extracts the optical wavelength information from the optical signal transmitted from the optical wavelength-information transmitting unit, and controls an optical wavelength of an optical signal corresponding to the extracted optical wavelength information to be output to the wavelength multiplexing unit.

As described above, in the wavelength-multiplexing optical transmission system according to the first embodiment, even if the wavelength-multiplexing optical transmission apparatus has a trouble, it is possible to set a specified optical wavelength on the transponder stably. Furthermore, as a method of transmitting-optical wavelength information to the transponder, in the wavelength-multiplexing optical transmission system according to the first embodiment, optical wavelength information is directly transmitted to the transponder, and thus an optical wavelength can be set on the transponder more precisely as compared with a method of transmitting optical wavelength information by outputting the number of optical pulses corresponding to the optical wavelength information.

Figure 4:
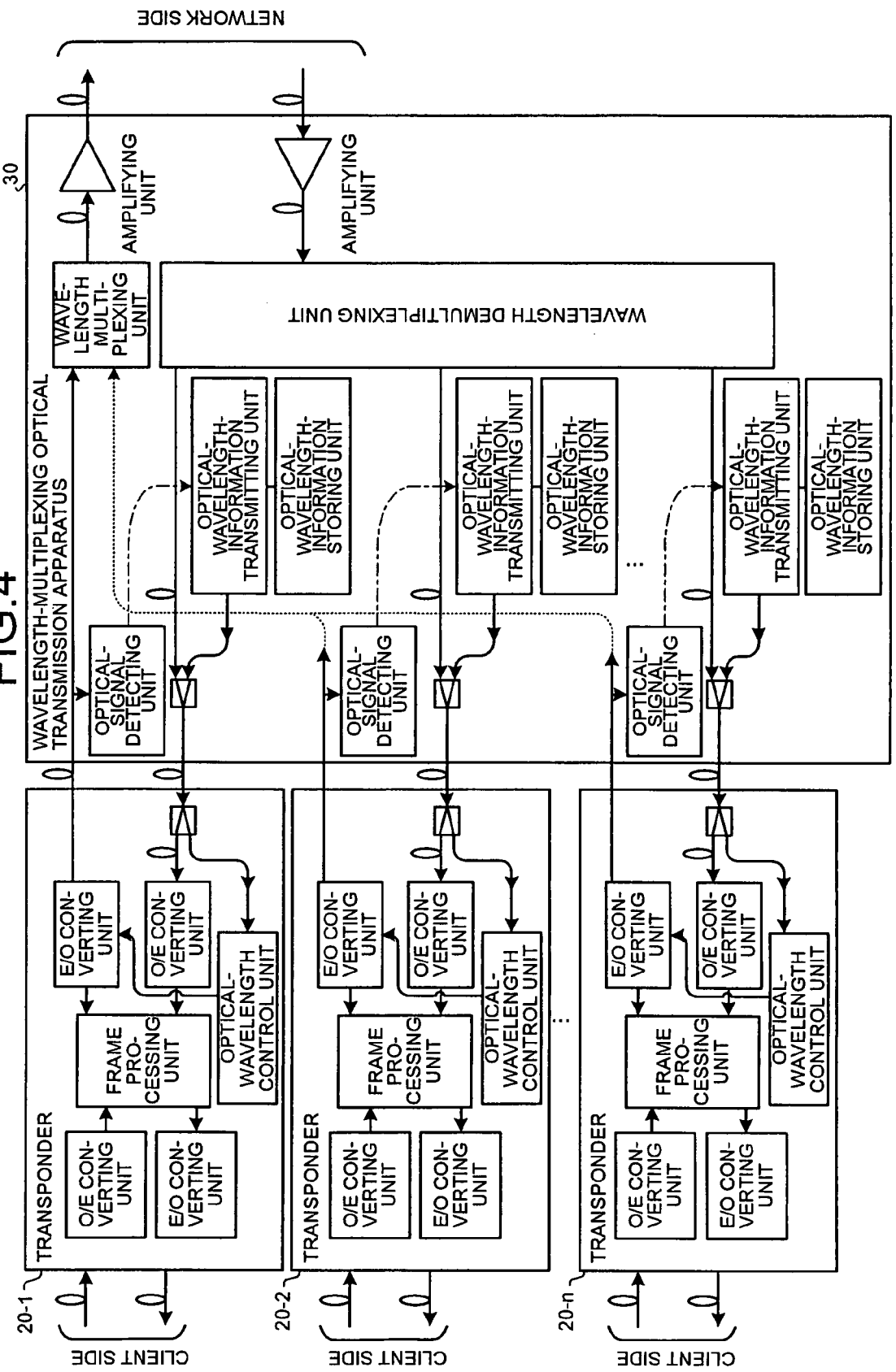
FIG. 4 is a simplified block diagram of an overall configuration of the wavelength-multiplexing optical transmission system shown in FIG. 2.

A configuration of the wavelength-multiplexing optical transmission system according to the first embodiment is described in detail below with reference to FIGS. 2 to 4.

Figure 2:
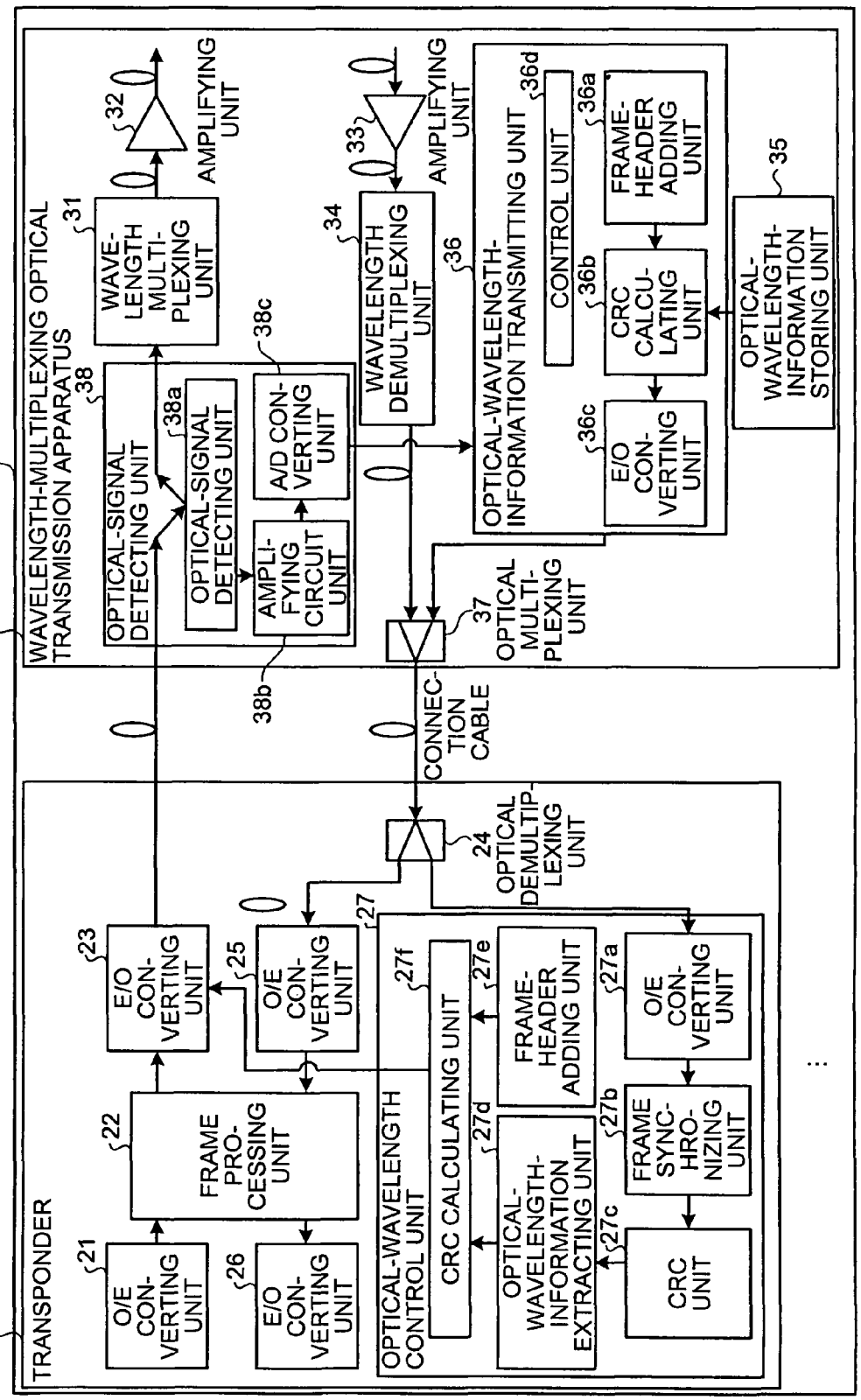
FIG. 2 is a detailed block diagram of the wavelength-multiplexing optical transmission system according to the first embodiment.

FIG. 2 is a detailed block diagram of a wavelength-multiplexing optical transmission system 10 according to the first embodiment. The wavelength-multiplexing optical transmission system 10 includes a transponder 20, a wavelength-multiplexing optical transmission apparatus 30, and a connection cable. The transponder 20 and the wavelength-multiplexing optical transmission apparatus 30 are connected to each other by the connection cable.

The transponder 20 outputs an optical signal with a specified optical wavelength. The transponder 20 includes an optical-to-electrical (O/E) converting unit 21, a frame processing unit 22, an electrical-to-optical (E/O) converting unit 23, an optical demultiplexing unit 24, an O/E converting unit 25, an E/O converting unit 26, and an optical-wavelength control unit 27.

The O/E converting unit 21 converts an optical signal into an electrical signal. Specifically, the O/E converting unit 21 is connected between a client side terminal and the frame processing unit 22. When receiving an optical signal from the client side terminal, the O/E converting unit 21 converts the optical signal into an electrical signal, and outputs the electrical signal to the frame processing unit 22.

The frame processing unit 22 splits data into fixed length data, and constructs a frame by adding control information and the like to the fixed length data, or inversely, removes a frame from data with a frame construction. Specifically, the frame processing unit 22 is connected between the O/E converting unit 21 and the E/O converting unit 23. When receiving electrical signal data from the O/E converting unit 21, the frame processing unit 22 splits the data into fixed length data, and constructs a frame by adding control information and the like to the fixed length data, and then outputs the data with the frame construction to the E/O converting unit 23. Furthermore, the frame processing unit 22 is also connected between the O/E converting unit 25 and the E/O converting unit 26. When receiving electrical signal data from the O/E converting unit 25, the frame processing unit 22 removes a frame from the received electrical signal data, and outputs the data without the frame to the E/O converting unit 26.

The E/O converting unit 23 converts an electrical signal into an optical signal with a narrow band (NB) optical wavelength, and outputs the optical signal with the NB optical wavelength. Specifically, the E/O converting unit 23 is connected between the frame processing unit 22 and the wavelength-multiplexing optical transmission apparatus 30. When receiving an electrical signal from the frame processing unit 22, the E/O converting unit 23 converts the electrical signal into an optical signal with an NB optical wavelength, and outputs the optical signal with the NB optical wavelength to the wavelength-multiplexing optical transmission apparatus 30. Furthermore, the E/O converting unit 23 is also connected to the optical-wavelength control unit 27. When receiving optical wavelength information from the optical-wavelength control unit 27, the E/O converting unit 23 outputs an optical signal with an optical wavelength corresponding to the received optical wavelength information to the wavelength-multiplexing optical transmission apparatus 30.

The optical demultiplexing unit 24 demultiplexes a multiplexed optical signal by each of optical wavelengths. Specifically, the optical demultiplexing unit 24 is connected between the wavelength-multiplexing optical transmission apparatus 30 and the O/E converting unit 25, and between the wavelength-multiplexing optical transmission apparatus 30 and the optical-wavelength control unit 27. When receiving a multiplexed optical signal from the wavelength-multiplexing optical transmission apparatus 30, the optical demultiplexing unit 24 demultiplexes the multiplexed optical signal by each of the optical wavelengths, and outputs optical signals with each of the optical wavelengths respectively to the O/E converting unit 25 and the optical-wavelength control unit 27. In this case, the optical signal received from the wavelength-multiplexing optical transmission apparatus 30 is a combination of a main signal and optical wavelength information. Therefore, the optical demultiplexing unit 24 demultiplexes the optical signal into the main signal and the optical wavelength information and outputs the main signal to the O/E converting unit 25 and the optical wavelength information to the optical-wavelength control unit 27.

The O/E converting unit 25 converts an optical signal into an electrical signal. Specifically, the O/E converting unit 25 is connected between the optical demultiplexing unit 24 and the frame processing unit 22. When receiving an optical signal from the optical demultiplexing unit 24, the O/E converting unit 25 converts the received optical signal into an electrical signal, and outputs the electrical signal to the frame processing unit 22.

The E/O converting unit 26 converts an electrical signal into an optical signal. Specifically, the E/O converting unit 26 is connected between the frame processing unit 22 and the client side terminal. When receiving an electrical signal from the frame processing unit 22, the E/O converting unit 26 converts the received electrical signal into an optical signal, and outputs the optical signal to the client side terminal.

The optical-wavelength control unit 27 controls an optical wavelength of an optical signal subjected to be input to a wavelength multiplexing unit 31. The wavelength multiplexing unit 31 is explained subsequently. The optical-wavelength control unit 27 includes an O/E converting unit 27a, a frame synchronizing unit 27b, a cyclic redundancy check (CRC) unit 27c, an optical-wavelength-information extracting unit 27d, a frame-header adding unit 27e, and a CRC calculating unit 27f.

The O/E converting unit 27a converts an optical signal into an electrical signal. Specifically, the O/E converting unit 27a is connected between the optical demultiplexing unit 24 and the frame synchronizing unit 27b. When receiving an optical signal from the optical demultiplexing unit 24, the O/E converting unit 27a converts the received optical signal into an electrical signal, and outputs the electrical signal to the frame synchronizing unit 27b. In this case, the optical signal received from the optical demultiplexing unit 24 is a signal for transmitting optical wavelength information. Therefore, the O/E converting unit 27a converts an optical signal for transmitting the optical wavelength information into an electrical signal, and outputs the electrical signal to the frame synchronizing unit 27b.

The frame synchronizing unit 27b performs frame synchronization based on a frame header included in electrical signal data with a frame configuration. Specifically, the frame synchronizing unit 27b is connected between the O/E converting unit 27a and the CRC unit 27c. When receiving an electrical signal from the O/E converting unit 27a, the frame synchronizing unit 27b performs frame synchronization of the received electrical signal based on a frame header included in electrical signal data with a frame configuration, and outputs the electrical signal to the CRC unit 27c. In this case, the electrical signal received from the O/E converting unit 27a is a signal for transmitting optical wavelength information. Therefore, the frame synchronizing unit 27b performs frame synchronization of an electrical signal for transmitting the optical wavelength information based on a frame header included in electrical signal data with a frame configuration, and outputs the electrical signal for transmitting the optical wavelength information to the CRC unit 27c.

The CRC unit 27c performs a CRC of data, and detects whether there is any error in the data. Specifically, the CRC unit 27c is connected between the frame synchronizing unit 27b and the optical-wavelength-information extracting unit 27d. When receiving data from the frame synchronizing unit 27b, the CRC unit 27c performs a CRC of the received data, and outputs the data to the optical-wavelength-information extracting unit 27d. If any error is detected in the data, the CRC unit 27c discards the data. In this case, the data received from the frame synchronizing unit 27b is data on optical wavelength information. Therefore, the CRC unit 27c performs a CRC of data on optical wavelength information, and outputs the data to the optical-wavelength-information extracting unit 27d.

The optical-wavelength-information extracting unit 27d extracts optical wavelength information from data. Specifically, the optical-wavelength-information extracting unit 27d is connected between the CRC unit 27c and the CRC calculating unit 27f. When receiving data from the CRC unit 27c, the optical-wavelength-information extracting unit 27d extracts optical wavelength information from the received data, and outputs the extracted optical wavelength information to the CRC calculating unit 27f.

The frame-header adding unit 27e creates a frame header, and adds the created frame header to data. Specifically, the frame-header adding unit 27e is connected to the CRC calculating unit 27f. The frame-header adding unit 27e creates a frame header for optical wavelength information extracted by the optical-wavelength-information extracting unit 27d, and adds the created frame header to the optical wavelength information, and then outputs the optical wavelength information with the frame header to the CRC calculating unit 27f.

The CRC calculating unit 27f adds a byte required for a CRC. Specifically, the CRC calculating unit 27f is connected between the optical-wavelength-information extracting unit 27d and the E/O converting unit 23, and also between the frame-header adding unit 27e and the E/O converting unit 23. When receiving optical wavelength information from the optical-wavelength-information extracting unit 27d and the frame-header adding unit 27e, the CRC calculating unit 27f adds a byte required for a CRC to the received optical wavelength information, and outputs the optical wavelength information to the E/O converting unit 23.

As described above, in the optical-wavelength control unit 27, an optical signal for optical wavelength information transmitted from the wavelength-multiplexing optical transmission apparatus 30 is converted into an electrical signal by the O/E converting unit 27a, and frame synchronization of electrical signal data is performed by the frame synchronizing unit 27b, and an error detection of the electrical signal data is performed by the CRC unit 27c, and optical wavelength information is extracted from the electrical signal data by the optical-wavelength-information extracting unit 27d, and a frame header is added to the extracted optical wavelength information by the frame-header adding unit 27e, and a byte required for a CRC is further added to the optical wavelength information by the CRC calculating unit 27f, and then the optical wavelength information is output to the E/O converting unit 23. As a result, the optical-wavelength control unit 27 can control an optical wavelength to correspond to the extracted optical wavelength information, and output an optical signal with the optical wavelength to the wavelength multiplexing unit 31.

The wavelength-multiplexing optical transmission apparatus 30 multiplexes optical signals with different wavelengths received from the transponder 20 into an optical signal, and demultiplexes the multiplexed optical signal by each of the wavelengths. The wavelength-multiplexing optical transmission apparatus 30 includes the wavelength multiplexing unit 31, an amplifying unit 32, an amplifying unit 33, a wavelength demultiplexing unit 34, an optical-wavelength-information storing unit 35, an optical-wavelength-information transmitting unit 36, an optical multiplexing unit 37, and an optical-signal detecting unit 38.

The wavelength multiplexing unit 31 multiplexes optical signals with different wavelengths received from the transponder 20 into an optical signal. Specifically, the wavelength multiplexing unit 31 is connected between the optical-signal detecting unit 38 and the amplifying unit 32. When receiving an optical signal transmitted from the transponder 20 via the optical-signal detecting unit 38, the wavelength multiplexing unit 31 multiplexes received optical signals with different wavelengths into an optical signal, and outputs the multiplexed optical signal to the amplifying unit 32.

The amplifying unit 32 amplifies an optical signal to raise an optical level of the optical signal to a certain optical level necessary for transmission. Specifically, the amplifying unit 32 is connected between the wavelength multiplexing unit 31 and a network. When receiving an optical signal from the wavelength multiplexing unit 31, the amplifying unit 32 amplifies the received optical signal to raise an optical level of the optical signal to a certain optical level necessary for transmission, and outputs the certain optical level of the optical signal to the network.

The amplifying unit 33 amplifies an optical signal that an optical level of the optical signal is dropped in the process of transmission. Specifically, the amplifying unit 33 is connected between the network and the wavelength demultiplexing unit 34. When receiving an optical signal from the network, the amplifying unit 33 amplifies the received optical signal because an optical level of the received optical signal is dropped in the process of transmission, and outputs the amplified optical signal to the wavelength demultiplexing unit 34.

The wavelength demultiplexing unit 34 demultiplexes a multiplexed optical signal by each of wavelengths, and outputs optical signals with each of the wavelengths to the transponder 20. Specifically, the wavelength demultiplexing unit 34 is connected between the amplifying unit 33 and the optical multiplexing unit 37. When receiving an optical signal from the amplifying unit 33, the wavelength demultiplexing unit 34 demultiplexes the received optical signal by each of the wavelengths, and outputs optical signals,with each of the wavelengths to the transponder 20 via the optical multiplexing unit 37.

The optical-wavelength-information storing unit 35 stores therein optical wavelength information on an optical wavelength of an optical signal to be output from the transponder 20. Specifically, the optical-wavelength-information storing unit 35 is connected to the optical-wavelength-information transmitting unit 36, and outputs stored optical wavelength information to the optical-wavelength-information transmitting unit 36. FIG. 3 is an example of optical wavelength information stored in the optical-wavelength-information storing unit 35. As shown in FIG. 3, the optical wavelength information is stored together with a code, which is used in the wavelength-multiplexing optical transmission system 10, in associated manner. For example, the optical-wavelength-information storing unit 35 stores therein optical wavelength information "λ1" together with a code "01(h)" in associated manner, and optical wavelength information "λ2" together with a code "02(h)" in associated manner.

The optical-wavelength-information transmitting unit 36 transmits optical wavelength information stored in the optical-wavelength-information storing unit 35 to the transponder 20 via the connection cable. The optical-wavelength-information transmitting unit 36 includes a frame-header adding unit 36a, a CRC calculating unit 36b, an E/O converting unit 36c, and a control unit 36d.

The frame-header adding unit 36a creates a frame header, and adds the created frame header to data. Specifically, the frame-header adding unit 36a is connected to the CRC calculating unit 36b. The frame-header adding unit 36a creates a frame header for optical wavelength information stored in the optical-wavelength-information storing unit 35, and adds the created frame header to the optical wavelength information, and then outputs the optical wavelength information with the frame header to the CRC calculating unit 36b.

The CRC calculating, unit 36b adds a byte required for a CRC to data. Specifically, the CRC calculating unit 36b is connected to the optical-wavelength-information storing unit 35, and further connected between the frame-header adding unit 36a and the E/O converting unit 36c. When receiving optical wavelength information from the optical-wavelength-information storing unit 35 and the frame-header adding unit 36a, the CRC calculating unit 36b adds a byte required for a CRC to the received optical wavelength information, and outputs the optical wavelength information to the E/O converting unit 36c.

The E/O converting unit 36c converts an electrical signal into an optical signal. Specifically, the E/O converting unit 36c is connected between the CRC calculating unit 36b and the optical multiplexing unit 37. When receiving an electrical signal from the CRC calculating unit 36b, the E/O converting unit 36c converts the received electrical signal into an optical signal, and outputs the optical signal to the transponder 20 via the optical multiplexing unit 37. In this case, the electrical signal received from the CRC calculating unit 36b is a signal for transmitting optical wavelength information. Therefore, the E/O converting unit 36c converts the electrical signal of the optical wavelength information into an optical signal, and outputs the optical signal to the transponder 20 via the optical multiplexing unit 37.

The control unit 36d controls the frame-header adding unit 36a, the CRC calculating unit 36b, and the E/O converting unit 36c.

As described above, in the optical-wavelength-information transmitting unit 36, a frame header is added to optical wavelength information stored in the optical-wavelength-information storing unit 35 by the frame-header adding unit 36a, and a byte required for a CRC is further added to the optical wavelength information by the CRC calculating unit 36b, and an electrical signal for transmitting the optical wavelength information is converted into an optical signal by the E/O converting unit 36c, and then the optical wavelength information, which is converted into the optical signal with a specified optical wavelength, is transmitted to the transponder 20.

The optical multiplexing unit 37 multiplexes optical signals with different optical wavelengths into an optical signal. Specifically, the optical multiplexing unit 37 is connected between the wavelength demultiplexing unit 34 and the transponder 20, and also between the optical-wavelength-information transmitting unit 36 and the transponder 20. When receiving optical signals respectively from the wavelength demultiplexing unit 34 and the optical-wavelength-information transmitting unit 36, the optical multiplexing unit 37 multiplexes the received optical signals into an optical signal, and outputs the multiplexed optical signal to the transponder 20. In this case, the optical signal received from the optical-wavelength-information transmitting unit 36 is a signal for transmitting optical wavelength information. Therefore, the optical multiplexing unit 37 multiplexes the main signal received from the wavelength demultiplexing unit 34 and the optical signal for the optical wavelength information received from the optical-wavelength-information transmitting unit 36 into an optical signal into an optical signal, and outputs the multiplexed optical signal to the transponder 20.

The optical-signal detecting unit 38 monitors optical power of an optical signal, and detects an optical level of the optical signal. The optical-signal detecting unit 38 includes an optical-signal detecting unit 38a, an amplifying circuit unit 38b, and an analog-to-digital (A/D) converting unit 38c.

The optical-signal detecting unit 38a monitors optical power of an optical signal, and detects an optical level of the optical signal. Specifically, the optical-signal detecting unit 38a is connected between the transponder 20 and the wavelength multiplexing unit 31. When receiving an optical signal from the transponder 20, the optical-signal detecting unit 38a monitors optical power of the received optical signal, and detects an optical level of the optical signal. Furthermore, the optical-signal detecting unit 38a is also connected to the amplifying circuit unit 38b, and outputs the detected optical level of the optical signal to the amplifying circuit unit 38b.

The amplifying circuit unit 38b amplifies an optical level of an optical signal. Specifically, the amplifying circuit unit 38b is connected between the optical-signal detecting unit 38a and the A/D converting unit 38c. When receiving an optical signal from the optical-signal detecting unit 38a, the amplifying circuit unit 38b amplifies an optical level of the received optical signal, and outputs the amplified optical level of the optical signal to the A/D converting unit 38c.

The A/D converting unit 38c converts an analog signal into a digital signal. Specifically, the A/D converting unit 38c is connected between the amplifying circuit unit 38b and the optical-wavelength-information transmitting unit 36. When receiving an optical signal from the amplifying circuit unit 38b, the A/D converting unit 38c converts an analog signal of an optical level of the received optical signal into a digital signal, and outputs the digital signal to the optical-wavelength-information transmitting unit 36.

As described above, in the optical-signal detecting unit 38, optical power of an optical signal received from the transponder 20 is monitored to detect an optical level of the optical signal by the optical-signal detecting unit 38a, and the detected optical level of the optical signal is amplified by the amplifying circuit unit 38b, and then the amplified optical level of the optical signal is converted into a digital signal and output to the optical-wavelength-information transmitting unit 36 by the A/D converting unit 38c. Then, the control unit 36d stops controlling the frame-header adding unit 36a, the CRC calculating unit 36b, and the E/O converting unit 36c.

An overall configuration of the wavelength-multiplexing optical transmission system 10 is explained in detail below with reference to FIG. 4. As shown in FIG. 4, the wavelength-multiplexing optical transmission system 10 according to the first embodiment includes a plurality of transponders 20-1 to 20-n and the wavelength-multiplexing optical transmission apparatus 30.

Each of ports of the wavelength multiplexing unit is connected to each of the transponders 20-1 to 20-n, and each of ports of the wavelength demultiplexing unit is also connected to each of the transponders 20-1 to 20-n.

The each of the ports of the wavelength multiplexing unit is configured to respond to a specified optical wavelength only. The each of the ports of the wavelength demultiplexing unit is also configured to respond to a specified optical wavelength only. Also, each of the transponders 20-1 to 20-n outputs an optical signal with a specified optical wavelength. Therefore, the each of the transponders 20-1 to 20-n can be identified, as a set, with a specified port of the wavelength multiplexing unit and a specified port of the wavelength demultiplexing unit, which respectively respond to a specified optical wavelength of an optical signal output from each of the transponders 20-1 to 20-n. Consequently, the each of the transponders 20-1 to 20-n is connected, as a set, to the specified port of the wavelength multiplexing unit via a connection cable, and also connected, as a set, to the specified port of the wavelength demultiplexing unit via a connection cable.

Figure 5:
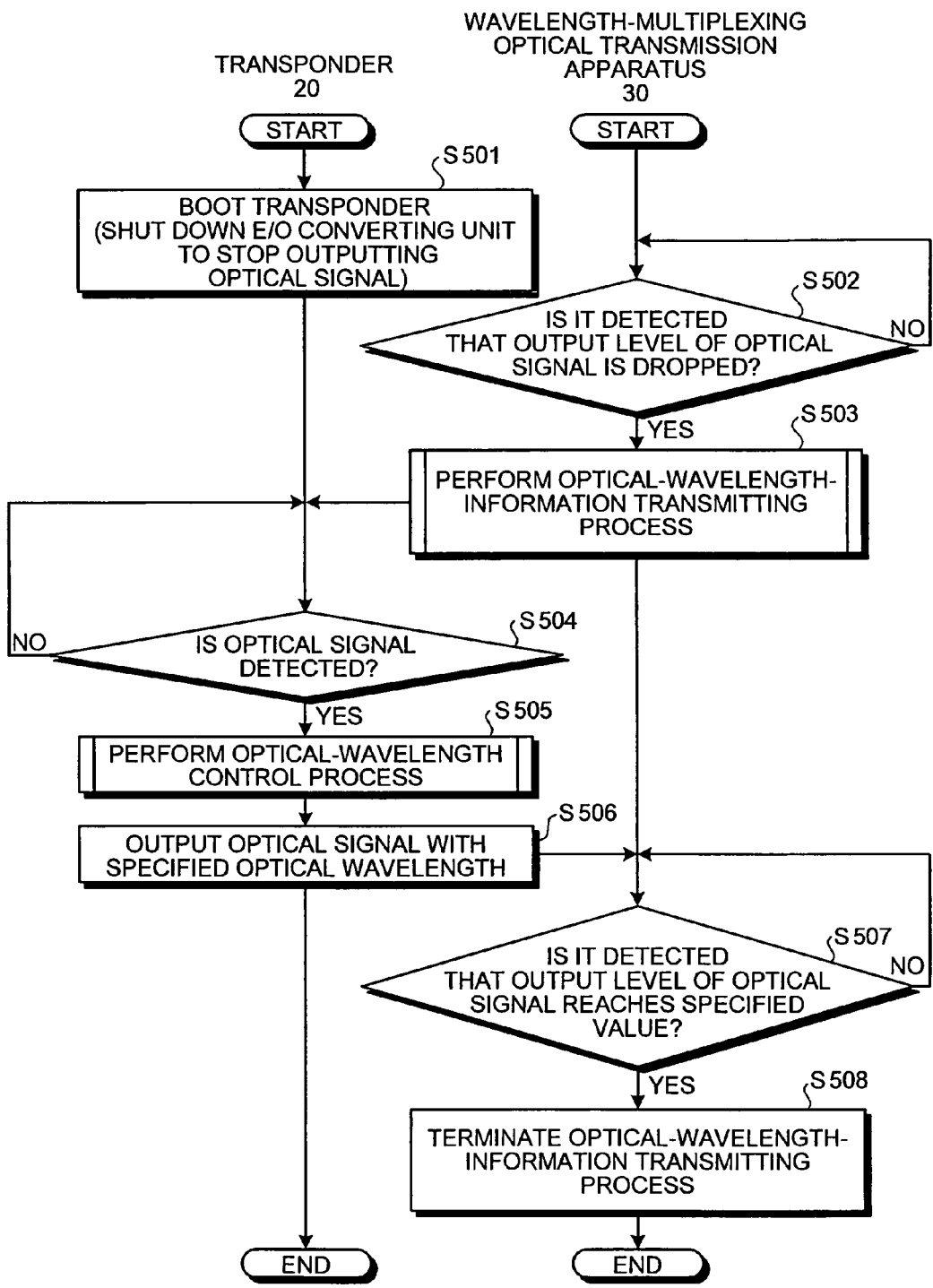
FIG. 5 is a flowchart of processing procedures performed in the wavelength-multiplexing optical transmission system according to the first embodiment.

Processing procedures performed by the transponder 20 and the wavelength-multiplexing optical transmission apparatus 30 in the wavelength-multiplexing optical transmission system 10 is explained in detail below with reference to FIG. 5. FIG. 5 is a flowchart of the processing procedures when the wavelength-multiplexing optical transmission system 10 switches from a regular operation mode to an operation mode for setting an optical wavelength on the transponder 20.

The wavelength-multiplexing optical transmission system 10 boots (or reboots) up the transponder 20 (step S501). Then, the transponder 20 shuts down the E/O converting unit 23 to stop outputting an optical signal.

At this time, in the wavelength-multiplexing optical transmission apparatus 30, the optical-signal detecting unit 38 determines whether it is detected that an output level of an optical signal is dropped (step S502). If it is not detected that the output level of the optical signal is dropped (i.e., if it is in the regular operation mode) (NO at step S502), the process control repeats step S502 until it is detected that the output level of the optical signal is dropped.

If it is detected that the output level of the optical signal is dropped (YES at step S502), the optical-wavelength-information transmitting unit 36 performs an optical-wavelength-information transmitting process (step S503). Specifically, the optical-wavelength-information transmitting unit 36 transmits optical wavelength information stored in the optical-wavelength-information storing unit 35 to the transponder 20 via the connection cable.

On the other hand, in the transponder 20, upon the boot of the transponder 20 (step S501), the optical-wavelength control unit 27 determines whether an optical signal is detected (step S504). If any optical signal is not detected (NO at step S504), the process control repeats step S504 until an optical signal is detected.

If an optical signal is detected (YES at step S504), the optical-wavelength control unit 27 performs an optical-wavelength control process (step S505). Specifically, the optical-wavelength control unit 27 controls an optical wavelength of the optical-signal subjected to be output to the wavelength multiplexing unit 31 based on the optical wavelength information transmitted from the optical-wavelength-information transmitting unit 36.

Then, the E/O converting unit 23 outputs the optical signal with a specified optical wavelength to the wavelength multiplexing unit 31 (step S506).

On the other hand, in the wavelength-multiplexing optical transmission apparatus 30, after the optical-wavelength-information transmitting process is performed (step S503), the optical-signal detecting unit 38 determines whether it is detected that the output level of the optical signal reaches a specified value (step S507). If it is not detected that the output level of the optical signal reaches the specified value (NO at step S507), the process control repeats step S507 until it is detected that the output level of the optical signal reaches the specified value.

If it is detected that the output level of the optical signal reaches the specified value (YES at step S507), the optical-wavelength-information transmitting unit 36 terminates the optical-wavelength-information transmitting process (step S508).

In this manner, in the wavelength-multiplexing optical transmission system 10 according to the first embodiment, even if the wavelength-multiplexing optical transmission apparatus 30 has a trouble, it is possible to set a specified optical wavelength on the transponder 20 stably. Furthermore, as a method of transmitting optical wavelength information to the transponder, in the wavelength-multiplexing optical transmission system 10, optical wavelength information is directly transmitted to the transponder 20, and thus an optical wavelength can be set on the transponder 20 more precisely as compared with a method of transmitting optical wavelength information by outputting the number of optical pulses corresponding to the optical wavelength information.

Figure 6:
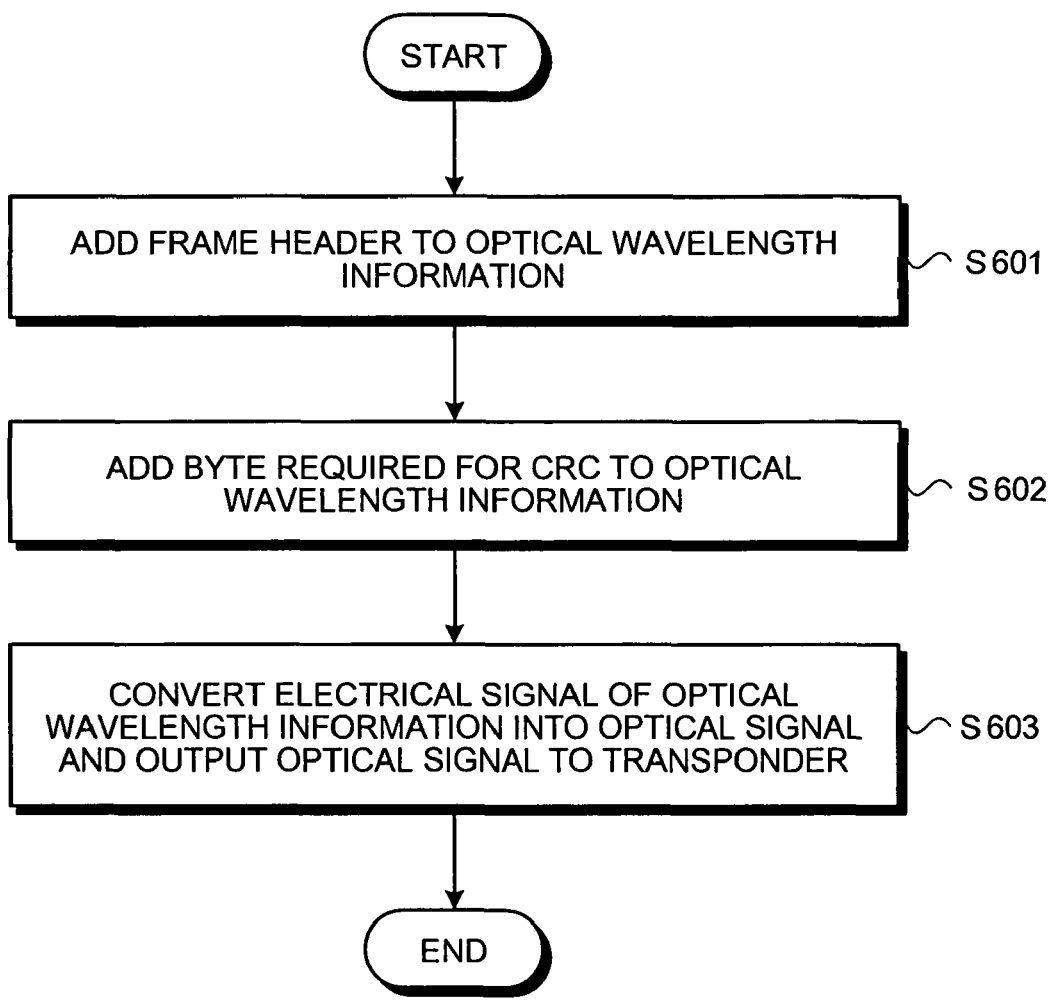
FIG. 6 is a flowchart of an optical-wavelength-information transmitting process performed by a wavelength-multiplexing optical transmission apparatus shown in FIG. 2.

The optical-wavelength-information transmitting process, which is performed by the optical-wavelength-information transmitting unit 36 at step S503 shown in FIG. 5, is explained in detail below with reference to FIG. 6.

In the wavelength-multiplexing optical transmission apparatus 30, the frame-header adding unit 36a adds a frame header to optical wavelength information (step S601). Specifically, the frame-header adding unit 36a creates a frame header for optical wavelength information stored in the optical-wavelength-information storing unit 35, and adds the created frame header to the optical wavelength information, and then outputs the optical wavelength information with the frame header to the CRC calculating unit 36b.

Then, the CRC calculating unit 36b adds a byte required for a CRC to the optical wavelength information (step S602). Specifically, the CRC calculating unit 36b adds a byte required for a CRC to the optical wavelength information received from the optical-wavelength-information storing unit 35 and the frame-header adding unit 36a, and outputs the optical wavelength information to the E/O converting unit 36c.

The E/O converting unit 36c converts an electrical signal of the optical wavelength information into an optical signal, and outputs the optical signal to the transponder 20 (step S603). Specifically, the E/O converting unit 36c converts an electrical signal of the optical wavelength information received from the CRC calculating unit 36b into an optical signal, and outputs the optical signal to the transponder 20 via the optical multiplexing unit 37.

Figure 7:
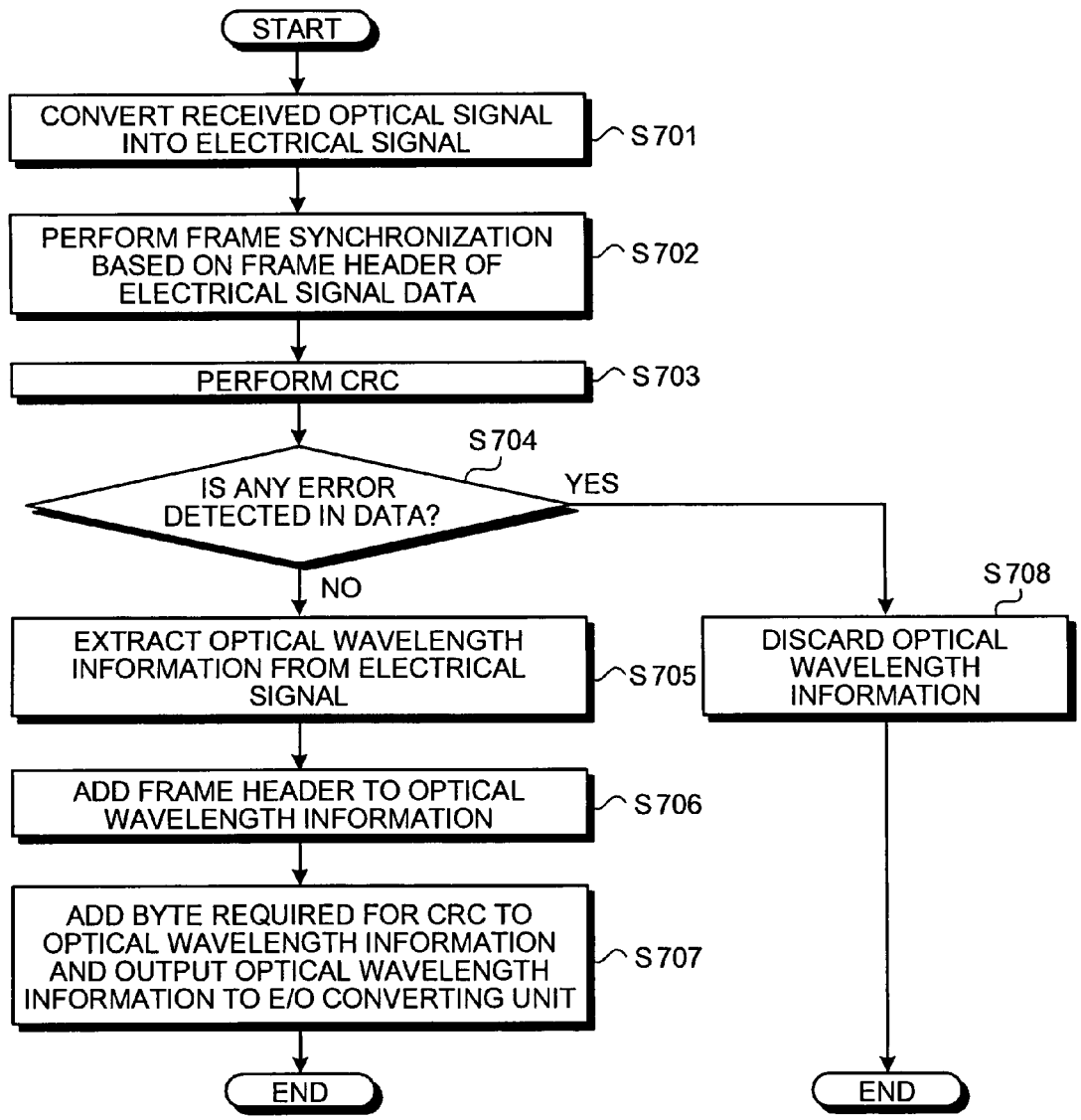
FIG. 7 is a flowchart of an optical-wavelength control process performed by a transponder shown in FIG. 2.

The optical-wavelength control process, which is performed by the optical-wavelength control unit 27 at step S505 shown in FIG. 5, is explained in detail below with reference to FIG. 7.

In the transponder 20, the O/E converting unit 27a converts the received optical signal of the optical wavelength information into an electrical signal (step S701). Specifically, the O/E converting unit 27a converts the optical signal of the optical wavelength information received from the optical demultiplexing unit 24 into an electrical signal, and outputs the electrical signal to the frame synchronizing unit 27b.

The frame synchronizing unit 27b performs frame synchronization based on a frame header of data (step S702). Specifically, the frame synchronizing unit 27b performs frame synchronization of the optical wavelength information received from the O/E converting unit 27a, which is electrical signal data with a frame configuration, based on a frame header included in the electrical signal data with the frame configuration, and outputs the electrical signal of the optical wavelength information to the CRC unit 27c.

The CRC unit 27c performs a CRC (step S703). Specifically, the CRC unit 27c performs a CRC of the optical wavelength information received from the frame synchronizing unit 27b, and outputs the optical wavelength information to the optical-wavelength-information extracting unit 27d.

Then, the CRC unit 27c determines whether any error is detected in the optical wavelength information (step S704). If any error is detected in the optical wavelength information (YES at step S704), the CRC unit 27c discards the optical wavelength information (step S708), and then terminates the optical-wavelength control process.

If any error is not detected in the optical wavelength information (NO at step S704), the optical-wavelength-information extracting unit 27d extracts the optical wavelength information (step S705). Specifically, the optical-wavelength-information extracting unit 27d extracts the optical wavelength information from the electrical signal data received from the CRC unit 27c, and outputs the extracted optical wavelength information to the CRC calculating unit 27f.

The frame-header adding unit 27e adds a frame header to the optical wavelength information (step S706). Specifically, the frame-header adding unit 27e creates a frame header for the optical wavelength information extracted by the optical-wavelength-information extracting unit 27d, and adds the created frame header to the optical wavelength information, and then outputs the optical wavelength information with the frame header to the CRC calculating unit 27f.

The CRC calculating unit 27f adds a byte required for a CRC to the optical wavelength information, and outputs the optical wavelength information to the E/O converting unit 23 (step S707). Specifically, the CRC calculating unit 27f adds a byte required for a CRC to the optical wavelength information received from the optical-wavelength-information extracting unit 27d and the frame-header adding unit 27e, and outputs the optical wavelength information to the E/O converting unit 23.

As described above, as the processing procedures performed in the wavelength-multiplexing optical transmission system 10 according to the first embodiment, in the wavelength-multiplexing optical transmission apparatus 30, the optical-signal detecting unit 38 detects that an output level of an optical signal is dropped, and the optical-wavelength-information transmitting unit 36 performs the optical-wavelength-information transmitting process, and the optical-signal detecting unit 38 also detects that an output level of an optical signal reaches a specified value, and then the optical-wavelength-information transmitting unit 36 terminates the optical-wavelength-information transmitting process. The present invention is not limited to the above processing procedures. As long as the optical-wavelength-information transmitting unit 36 performs the optical-wavelength-information transmitting process and terminates the process each time the process is completed, and also as long as the optical-wavelength control unit 27 performs the optical-wavelength control process, other processes can be skipped, or the order of the processing procedures can be changed.

Furthermore, the processing procedures of the optical-wavelength-information transmitting process is explained with reference to FIG. 6, but the present invention is not limited to the above processing procedures. As long as an electrical signal of optical wavelength information is converted into an optical signal and the optical signal of the optical wavelength information is transmitted to the transponder 20, other processes can be skipped, or the order of the processing procedures can be changed. Moreover, the processing procedures of the optical-wavelength control process in the transponder 20 is explained with reference to FIG. 7, but the present invention is not limited to the above processing procedures. As long as received optical wavelength information is input to the E/O converting unit, other processes can be skipped, or the order of the processing procedures can be changed.

As described above, the wavelength-multiplexing optical transmission system according to the first embodiment includes the transponder that is configured to output an optical signal with a specified optical wavelength, and the wavelength-multiplexing optical transmission apparatus, and the connection cable for connecting the transponder to the wavelength-multiplexing optical transmission apparatus. The wavelength-multiplexing optical transmission apparatus includes the wavelength multiplexing unit that multiplexes optical signals with different optical wavelengths received from the transponder into an optical signal, and the wavelength demultiplexing unit that demultiplexes a multiplexed optical signal by each of the optical wavelengths and outputs optical signals with each of the optical wavelengths to the transponder. The wavelength-multiplexing optical transmission apparatus stores therein optical wavelength information on an optical wavelength of an optical signal subjected to be output from the transponder, and transmits the stored optical wavelength information to the transponder via the connection cable. The transponder controls an optical wavelength of an optical signal subjected to be input to the wavelength multiplexing unit based on the received optical wavelength information. Therefore, in case the wavelength-multiplexing optical transmission apparatus has a trouble, it is possible to set a specified optical wavelength on the transponder stably. Furthermore, it is also possible to reduce a workload of an operator and errors in operation as compared with a method of setting an optical wavelength on the transponder manually with getting a confirmation. Moreover, when an optical wavelength is properly controlled, the optical-signal detecting unit detects that an output level of an optical signal reaches a specified value, and thus it is possible to confirm that the optical wavelength is properly controlled.

Furthermore, the wavelength-multiplexing optical transmission apparatus transmits optical wavelength information to the transponder by converting the optical wavelength information into an optical signal with a specified optical wavelength. Then, the transponder extracts the optical wavelength information from the received optical signal, and controls an optical wavelength of an optical signal to correspond to the extracted optical wavelength information so that the optical signal with the optical wavelength corresponding to the extracted optical wavelength information can be input to the wavelength multiplexing unit. Therefore, in case the wavelength-multiplexing optical transmission apparatus has a trouble, it is possible to set a specified optical wavelength on the transponder stably. Furthermore, optical wavelength information is directly transmitted to the transponder, and thus an optical wavelength can be set on the transponder more precisely as compared with a method of transmitting optical wavelength information by outputting the number of optical pulses corresponding to the optical wavelength information.

In the wavelength-multiplexing optical transmission system 10 according to the first embodiment, optical wavelength information is directly transmitted to the transponder 20 by being converted into an optical signal with a specified optical wavelength. Alternatively, optical wavelength information can be transmitted to the transponder by outputting the number of optical pulses corresponding to the optical wavelength information. A wavelength-multiplexing optical transmission system according to a second embodiment of the present invention, which employs the above alternative method, is explained below.

First, an outline of the wavelength-multiplexing optical transmission system according to the second embodiment is described below. The wavelength-multiplexing optical transmission system according to the second embodiment includes, in the same manner as that is according to the first embodiment, includes a transponder, a wavelength-multiplexing optical transmission apparatus, and a connection cable. The transponder is configured to output an optical signal with a specified optical wavelength. The wavelength-multiplexing optical transmission apparatus includes a wavelength multiplexing unit, a wavelength demultiplexing unit, an optical-wavelength-information transmitting unit, and an optical-wavelength-information storing unit. The wavelength multiplexing unit multiplexes optical signals with different optical wavelengths received from the transponder into an optical signal. The wavelength demultiplexing unit demultiplexes a multiplexed optical signal by each of the optical wavelengths, and outputs optical signals with each of the optical wavelengths to the transponder. The transponder and the wavelength-multiplexing optical transmission apparatus are connected to each other by the connection cable.

The optical-wavelength-information storing unit stores therein, in the same manner as that is according to the first embodiment, optical wavelength information on an optical wavelength of an optical signal subjected to be output from the transponder.

The optical-wavelength-information transmitting unit transmits optical wavelength information stored in the optical-wavelength-information storing unit to the transponder via the connection cable. Specifically, in the wavelength-multiplexing optical transmission system according to the second embodiment, the optical-wavelength-information transmitting unit transmits optical wavelength information to the transponder by outputting the number of optical pulses corresponding to the optical wavelength information. This is the difference between the first embodiment and the second embodiment.

An optical-wavelength control unit included in the transponder controls an optical wavelength of an optical signal subjected to be input to the wavelength multiplexing unit based on the optical wavelength information received from the optical-wavelength-information transmitting unit. Specifically, in the wavelength-multiplexing optical transmission system according to the second embodiment, the optical-wavelength control unit obtains the number of the optical pulses received from the optical-wavelength-information transmitting unit, and controls an optical wavelength of an optical signal so that an optical signal with an optical wavelength corresponding to the optical wavelength information corresponding to the number of the optical pulses can be input to the wavelength multiplexing unit.

In this manner, in the wavelength-multiplexing optical transmission system according to the second embodiment, even if the wavelength-multiplexing optical transmission apparatus has a trouble, it is possible to set a specified optical wavelength on the transponder stably. Furthermore, optical wavelength information is transmitted to the transponder by outputting the number of optical pulses corresponding to the optical wavelength information, and thus an optical wavelength can be set on the transponder more simply as compared with the method of transmitting optical wavelength information directly.

Figure 8:
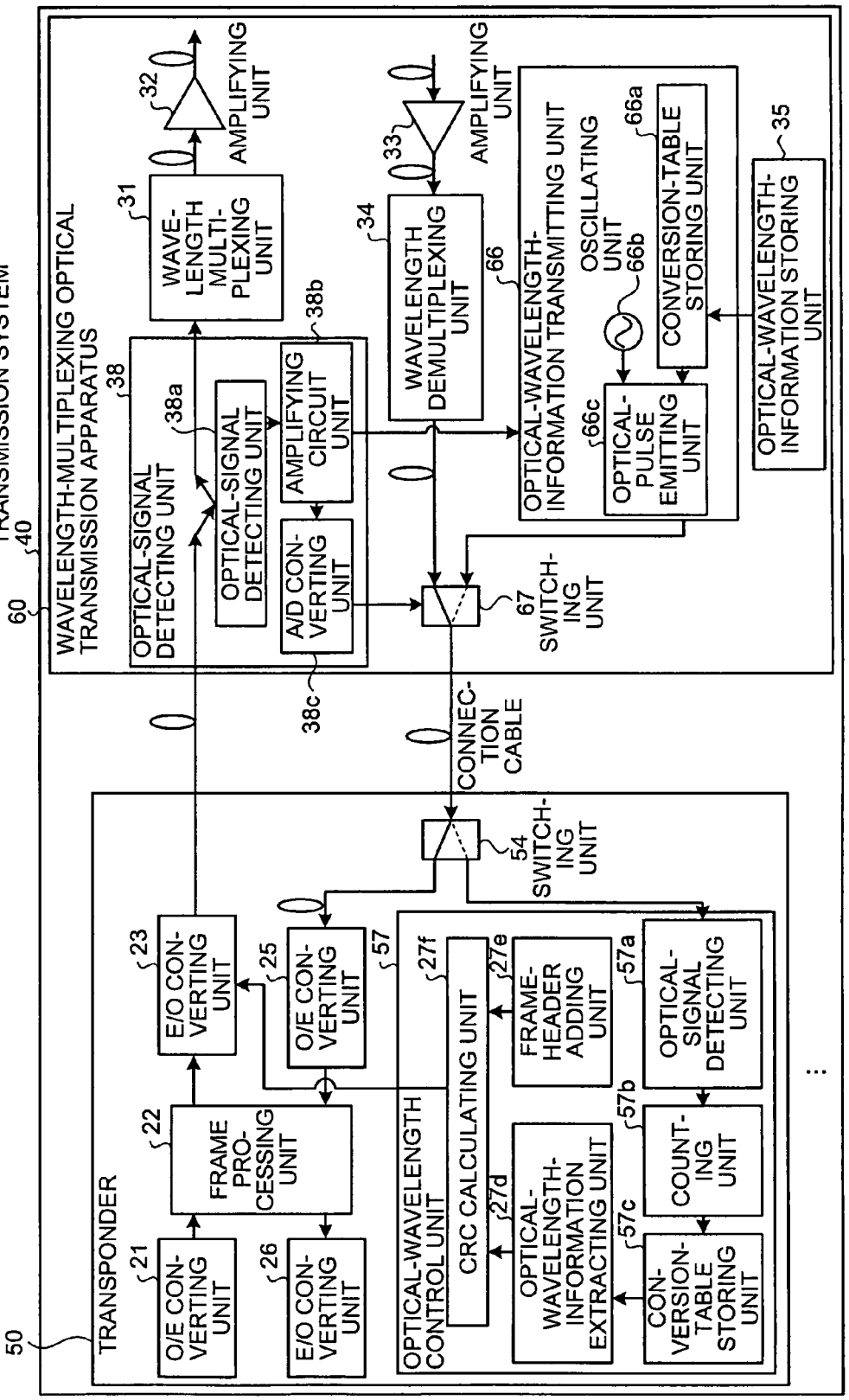
FIG. 8 is a block diagram of a wavelength-multiplexing optical transmission system according to a second embodiment of the present invention.

A configuration of a wavelength-multiplexing optical transmission system 40 according to the second embodiment is described in detail below with reference to FIGS. 8 and 9. FIG. 8 is a block diagram of the wavelength-multiplexing optical transmission system 40 according to the second embodiment.

As shown in FIG. 8, the wavelength-multiplexing optical transmission system 40 includes a transponder 50, a wavelength-multiplexing optical transmission apparatus 60, and a connection cable. The transponder 50 and the wavelength-multiplexing optical transmission apparatus 60 are connected to each other by the connection cable. The portions identical to those in FIG. 2 for the wavelength-multiplexing optical transmission system 10 according to the first embodiment are denoted with the same reference numerals and the description of those portions is omitted.

The transponder 50 is configured to output an optical signal with a specified optical wavelength. The transponder 50 includes the O/E converting unit 21, the frame processing unit 22, the E/O converting unit 23, a switching unit 54, the O/E converting unit 25, the E/O converting unit 26, and an optical-wavelength control unit 57.

The switching unit 54 switches a transmission destination of an optical signal received via the connection cable. Specifically, the switching unit 54 houses the connection cable for connecting the transponder 50 to the wavelength-multiplexing optical transmission apparatus 60. When an optical signal, which is received from the wavelength-multiplexing optical transmission apparatus 60 via the connection cable, is forwarded to the O/E converting unit 25, the switching unit 54 switches a transmission destination of the optical signal to the side of the O/E converting unit 25. When an optical signal is forwarded to the optical-wavelength control unit 57, the switching unit 54 switches a transmission destination of the optical signal to the side of the optical-wavelength control unit 57. Upon the boot of the transponder 50, the switching unit 54 switches a transmission destination of an optical signal to the side of the optical-wavelength control unit 57. After the E/O converting unit 23 outputs an optical signal with a specified optical wavelength to the wavelength-multiplexing optical transmission apparatus 60, the switching unit 54 switches a transmission destination of an optical signal to the side of the O/E converting unit 25.

The switching unit 54 is connected between the wavelength-multiplexing optical transmission apparatus 60 and the O/E converting unit 25, and also between the wavelength-multiplexing optical transmission apparatus 60 and the optical-wavelength control unit 57. When receiving an optical signal from the wavelength-multiplexing optical transmission apparatus 60, the switching unit 54 switches a transmission destination of the optical signal to the either side of the O/E converting unit 25 or the optical wavelength control unit 57. In this case, an optical signal received from the wavelength-multiplexing optical transmission apparatus 60 is a combination of a main signal and an output of the number of optical pulses corresponding to optical wavelength information. Therefore, the switching unit 54 switches to the side of the O/E converting unit 25 so that the main signal can be input to the O/E converting unit 25, and also switches to the side of the optical-wavelength control unit 57 so that the output of the number of the optical pulses can be input to the optical-wavelength control unit 57.

The optical-wavelength control unit 57 controls an optical wavelength of an optical signal subjected to be input to a wavelength multiplexing unit 61, which will be explained subsequently, based on received optical wavelength information. The optical-wavelength control unit 57 includes an optical-signal detecting unit 57a, a counting unit 57b, a conversion-table storing unit 57c, the optical-wavelength-information extracting unit 27d, the frame-header adding unit 27e, and the CRC calculating unit 27f. The portions identical to those in FIG. 2 for the first embodiment are denoted with the same reference numerals and the description of those portions is omitted.

The optical-signal detecting unit 57a detects an optical signal. Specifically, the optical signal detecting unit 57a is connected between the switching unit 54 and the counting unit 57b. The optical-signal detecting unit 57a detects an optical signal received via the switching unit 54, and converts the optical-signal into an electrical signal, and then outputs the electrical signal to the counting unit 57b. In this case, an optical signal received from the wavelength-multiplexing optical transmission apparatus 60 is an output of the number of optical pulses corresponding to optical wavelength information. Therefore, the optical-signal detecting unit 57a detects the output of the number of optical pulses corresponding to optical wavelength information, and converts the output of the number of optical pulses into an electrical signal, and then outputs the electrical signal to the counting unit 57b. Incidentally, if an output of the number of optical pulses received from the wavelength-multiplexing optical transmission apparatus 60 is input to the O/E converting unit 25, the O/E converting unit 25 cannot receive the optical signal (the output of the number of optical pulses) properly because the optical pulses do not have a frame configuration, so that frame synchronization cannot be performed.

The counting unit 57b counts the number of received optical pulses. Specifically, the counting unit 57b is connected between the optical-signal detecting unit 57a and the conversion-table storing unit 57c. When receiving an electrical signal from the optical-signal detecting unit 57a, the counting unit 57b counts the number of received optical pulses from the electrical signal, and inputs a count result to the conversion-table storing unit 57c.

The conversion-table storing unit 57c stores therein optical wavelength information and the number of received optical pulses in associated manner. Specifically, the conversion-table storing unit 57c is connected between the counting unit 57b and the optical-wavelength-information extracting unit 27d. When receiving the number of received optical pulses from the counting unit 57b, the conversion-table storing unit 57c detects optical wavelength information corresponding to the number of received optical pulses, and outputs the detected optical wavelength information to the optical-wavelength-information extracting unit 27d. For example, as shown in FIG. 9, the conversion-table storing unit 57c stores therein optical wavelength information "λ1" associated with the number of received optical pulses "1 pulse/sec", which indicates that is 1 optical pulse is output per second, and optical wavelength information "λ2" associated with the number of received optical pulses "2 pulse/sec", which indicates that 2 optical pulses are output per second.

The wavelength-multiplexing optical transmission apparatus 60 multiplexes optical signals with different wavelengths received from the transponder 50 into an optical signal, or demultiplexes a multiplexed optical signal by each of the wavelengths. The wavelength-multiplexing optical transmission apparatus 60 includes the wavelength multiplexing unit 31, the amplifying unit 32, the amplifying unit 33, the wavelength demultiplexing unit 34, the optical-wavelength-information storing unit 35, an optical-wavelength-information transmitting unit 66, a switching unit 67, and the optical-signal detecting unit 38. The portions identical to those in FIG. 2 for the first embodiment are denoted with the same reference numerals and the description of those portions is omitted.

The optical-wavelength-information transmitting unit 66 transmits optical wavelength information stored in the optical-wavelength-information storing unit 35 to the transponder 50 via the connection cable. The optical-wavelength-information transmitting unit 66 includes a conversion-table storing unit 66a, an oscillating unit 66b, and an optical-pulse outputting unit 66c.

The conversion-table storing unit 66a stores therein optical wavelength information and the number of optical pulses subjected to be output in associated manner. Specifically, the conversion-table storing unit 66a is connected between the optical-wavelength-information storing unit 35 and the optical-pulse outputting unit 66c. When receiving optical wavelength information from the optical-wavelength-information storing unit 35, the conversion-table storing unit 66a detects the number of optical pulses corresponding to the received optical wavelength information, and outputs the detected number of optical pulses to the optical-pulse outputting unit 66c.

The oscillating unit 66b is used to determine a reference time for measurement. Specifically, the oscillating unit 66b is connected to the optical-pulse outputting unit 66c. A reference time for measurement is determined by using the oscillating unit 66b, and output to the optical-pulse outputting unit 66c. The optical-pulse outputting unit 66c outputs an optical pulse. Specifically, the optical-pulse outputting unit 66c is connected between the switching unit 67 and the conversion-table storing unit 66a, and also between the switching unit 67, and the oscillating unit 66b. The optical-pulse outputting unit 66c outputs the number of optical pulses received from the conversion-table storing unit 66a in accordance with the reference time for measurement, which is obtained by using the oscillating unit 66b, to the transponder 50 via the switching unit 67.

The switching unit 67 switches a transmission source of an optical signal subjected to be transmitted to the transponder 50 via the connection cable. Specifically, the switching unit 67 houses the connection cable for connecting the wavelength-multiplexing optical transmission apparatus 60 to the transponder 50. When an optical signal is transmitted from the wavelength demultiplexing unit 34 to the transponder 50 via the connection cable, the switching unit 67 switches to the side of the wavelength demultiplexing unit 34. When an optical signal is transmitted from the optical-wavelength-information transmitting unit 66 to the transponder 50 via the connection cable, the switching unit 67 switches to the side of the optical-wavelength-information transmitting unit 66. When the optical-signal detecting unit 38 detects that an output level of an optical signal is dropped, the switching unit 67 switches to the side of the optical-wavelength-information transmitting unit 66. When the optical-signal detecting unit 38 detects that an output level of an optical signal reaches a specified value, the switching unit 67 switches to the side of the wavelength demultiplexing unit 34.

The switching unit 67 is connected between the transponder 50 and the wavelength demultiplexing unit 34, and also between the transponder 50 and the optical-wavelength-information transmitting unit 66. When an optical signal is output from the wavelength demultiplexing unit 34 or the optical-wavelength-information transmitting unit 66, the optical signal is output to the transponder 50 via the switching unit 67. In this case, an optical signal output from the wavelength demultiplexing unit 34 is a main signal, and an optical signal output from the optical-wavelength-information transmitting unit 66 is an output of the number of optical pulses corresponding to optical wavelength information. Therefore, the switching unit 67 switches to the side of the wavelength demultiplexing unit 34 when the wavelength demultiplexing unit 34 outputs the main signal to the transponder 50, and switches to the side of the optical-wavelength-information transmitting unit 66 when the optical-wavelength-information transmitting unit 66 outputs the output of the number of optical pulses to the transponder 50.

Figure 10:
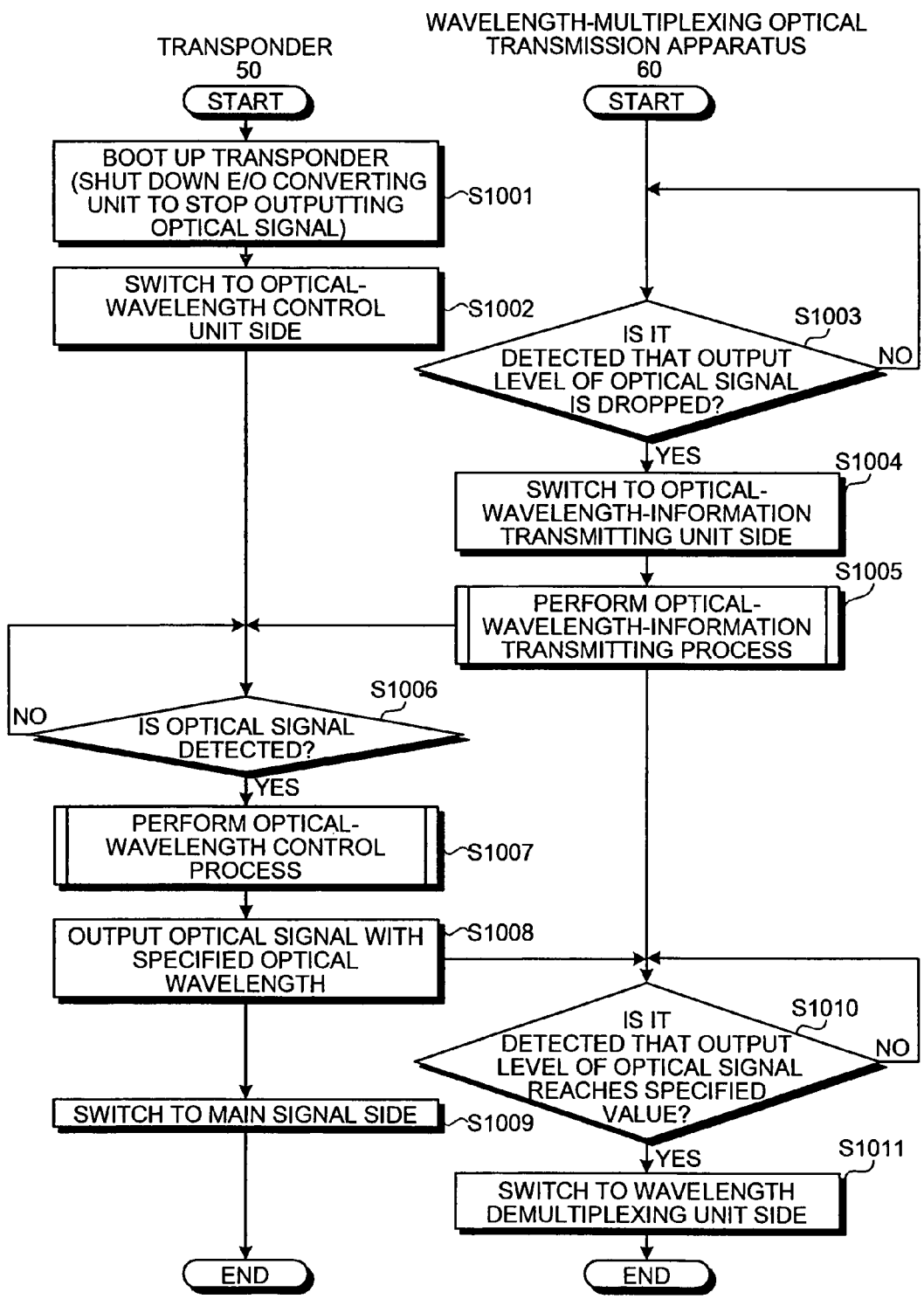
FIG. 10 is a flowchart of processing procedures performed in the wavelength-multiplexing optical transmission system according to the second embodiment.

Processing procedures performed by the transponder 50 and the wavelength-multiplexing optical transmission apparatus 60 in the wavelength-multiplexing optical transmission system 40 is explained in detail below with reference to FIG. 10. FIG. 10 is a flowchart of the processing procedures when the wavelength-multiplexing optical transmission system 40 switches from a regular operation mode to an operation mode for setting an optical wavelength on the transponder 50.

The wavelength-multiplexing optical transmission system 40 boots (or reboots) up the transponder 50 (step S1001). Then, the transponder 50 shuts down the E/O converting unit 23 to stop outputting an optical signal. The switching unit 54 switches to the side of the optical-wavelength control unit 57 (step S1002).

At this time, in the wavelength-multiplexing optical transmission apparatus 60, the optical-signal detecting unit 38 determines whether it is detected that an output level of an optical signal is dropped (step S1003). If it is not detected that the output level of the optical signal is dropped (i.e., if the wavelength-multiplexing optical transmission system 40 is in the regular operation mode) (NO at step S1003), the process control repeats step S1003 until it is detected that the output level of the optical signal is dropped.

If it is detected that the output level of the optical signal is dropped (YES at step S1003), the switching unit 67 switches to the side of the optical-wavelength-information transmitting unit 66 (step S1004).

Then, the optical-wavelength-information transmitting unit 66 performs an optical-wavelength-information transmitting process (step S1005). Specifically, the optical-wavelength-information transmitting unit 66 transmits optical wavelength information stored in the optical-wavelength-information storing unit 35 to the transponder 50 via the connection cable.

On the other hand, in the transponder 50, after the switching unit 54 switches to the side of the optical-wavelength control unit 57, the optical-wavelength control unit 57 determines whether an optical signal is detected (step S1006). If any optical signal is not detected (NO at step S1006), the process control repeats step 1006 until an optical signal is detected.

If an optical signal is detected (YES at step S1006), the optical-wavelength control unit 57 performs an optical-wavelength control process (step S1007). Specifically, the optical-wavelength control unit 57 controls an optical wavelength of an optical signal subjected to be input to the wavelength multiplexing unit 31 based on the optical wavelength information received from the optical-wavelength-information transmitting unit 66.

Then, the E/O converting unit 23 outputs an optical signal with a specified optical-wavelength (step S1008).

On the other hand, in the wavelength-multiplexing optical transmission apparatus 60, after the optical-wavelength-information transmitting process is performed, the optical-signal detecting unit 38 determines whether it is detected that an output level of an optical signal reaches a specified value (step S1010). If it is not detected that the output level of the optical signal reaches the specified value (NO at step S1010), the process control repeats step S1010 until it is detected that the output level of the optical signal reaches the specified value.

If it is detected that the output level of the optical signal reaches the specified value (YES at step S1010), the switching unit 67 switches to the side of the wavelength demultiplexing unit 34 (step S1011).

In this manner, in the wavelength-multiplexing optical transmission system 40 according to the second embodiment, even if the wavelength-multiplexing optical transmission apparatus 60 has a trouble, it is possible to set a specified optical wavelength on the transponder 50 stably. Furthermore, optical wavelength information is transmitted to the transponder 50 by outputting the number of optical pulses corresponding to the optical wavelength information, and thus an optical wavelength can be set on the transponder 50 more simply as compared with the method of transmitting optical wavelength information directly.

Figure 11:
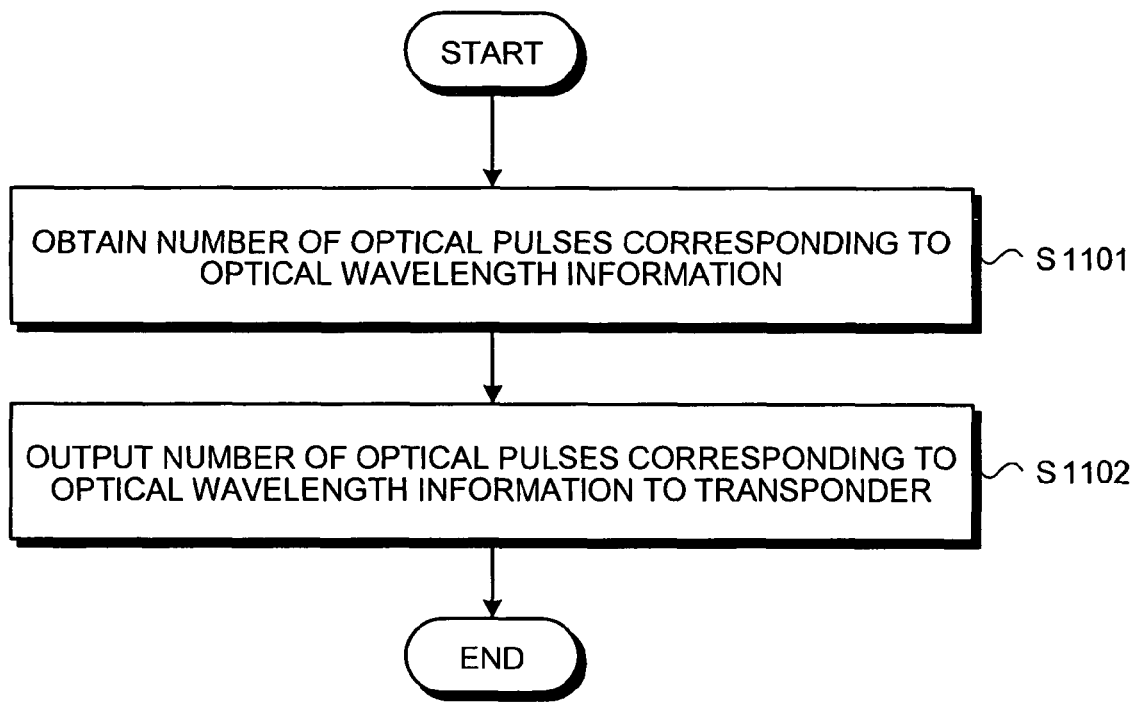
FIG. 11 is a flowchart of an optical-wavelength-information transmitting process performed by a wavelength-multiplexing optical transmission apparatus shown in FIG. 8.

The optical-wavelength-information transmitting process, which is performed by the optical-wavelength-information transmitting unit 66 at step S1005 shown in FIG. 10, is explained in detail below with reference to FIG. 11.

The conversion-table storing unit 66a obtains the number of optical pulses corresponding to optical wavelength information (step S1101). Specifically, the conversion-table storing unit 66a detects the number of optical pulses corresponding to the optical wavelength information received from the optical-wavelength-information storing unit 35, and outputs the detected number of optical pulses to the optical-pulse outputting unit 66c.

Then, the optical-pulse outputting unit 66c outputs the number of optical pulses corresponding to the optical wavelength information to the transponder 50 (step S1102). Specifically, the optical-pulse outputting unit 66c outputs the number of optical pulses received from the conversion-table storing unit 66a in accordance with a reference time for measurement, which is obtained by using the oscillating unit 66b, to the transponder 50 via the switching unit 67.

Figure 12:
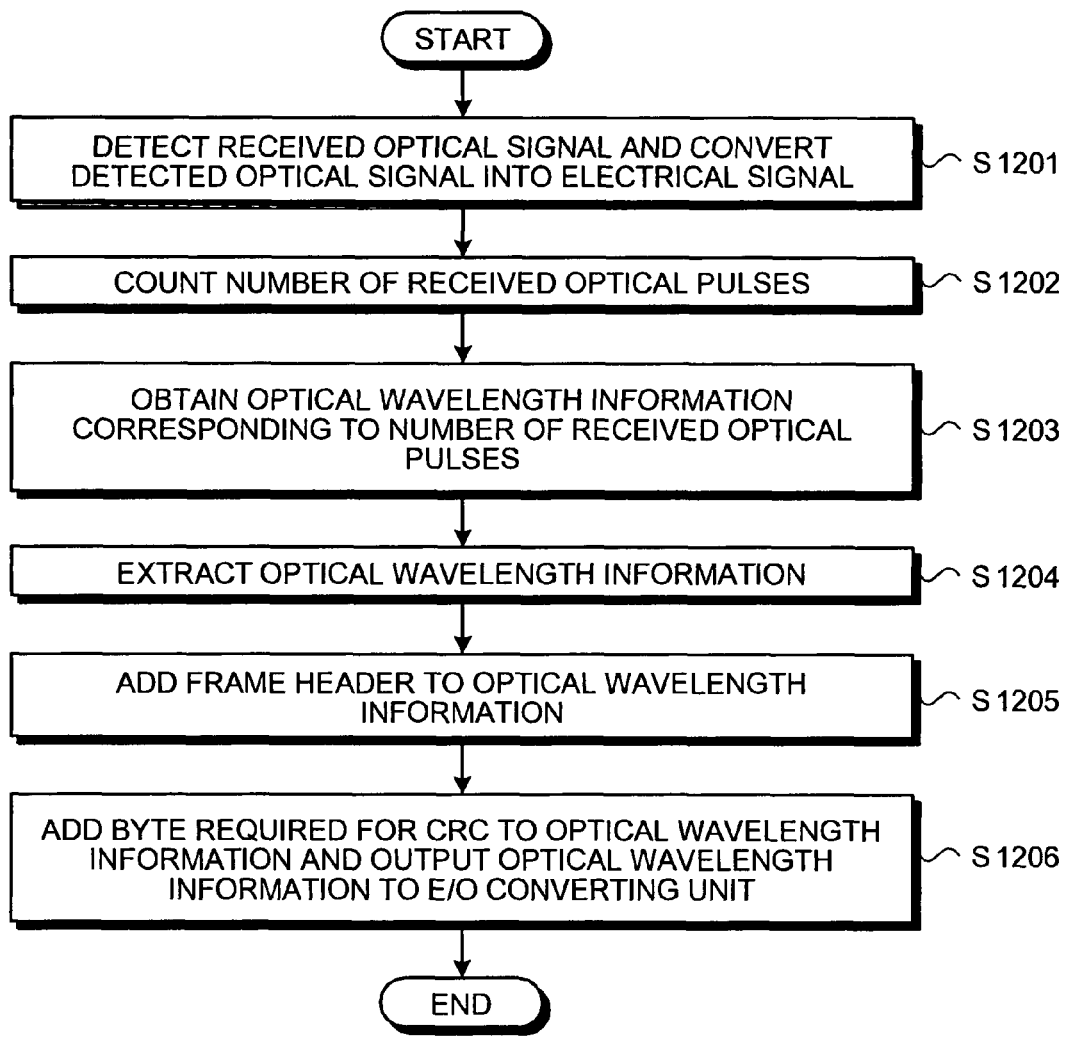
FIG. 12 is a flowchart of an optical-wavelength control process performed by a transponder shown in FIG. 8.

The optical-wavelength control process, which is performed by the optical-wavelength control unit 57 at step S1007 shown in FIG. 10, is explained in detail below with reference to FIG. 12.

The optical-signal detecting unit 57a detects a received optical signal, and converts the detected optical signal into an electrical signal (step S1201). Specifically, the optical-signal detecting unit 57a detects an output of the number of optical pulses received from the wavelength-multiplexing optical transmission-apparatus 60, and converts the detected output of the number of optical pulses (the optical signal) into an electrical signal, and outputs the electrical signal to the counting unit 57b.

The counting unit 57b counts the number of received optical pulses (step S1202). Specifically, the counting unit 57b counts the number of received optical pulses from the electrical signal received from the optical-signal detecting unit 57a, and outputs a count result to the conversion-table storing unit 57c.

The conversion-table storing unit 57c obtains optical wavelength information corresponding to the number of received optical pulses (step S1203). Specifically, the conversion-table storing unit 57c detects optical wavelength information corresponding to the number of optical pulses received from the counting unit 57b, and outputs the detected optical wavelength information to the optical-wavelength-information extracting unit 27d.

The optical-wavelength-information extracting unit 27d extracts the optical wavelength information (step S1204). Specifically, the optical-wavelength-information extracting unit 27d extracts the optical wavelength information input from data received from the conversion-table storing unit 57c, and outputs the extracted optical wavelength information to the CRC calculating unit 27f.

The frame-header adding unit 27e adds a frame header to the optical wavelength information (step S1205). Specifically, the frame-header adding unit 27e creates a frame header for the optical wavelength information extracted by the optical-wavelength-information extracting unit 27d, and adds the created frame header to the extracted optical wavelength information, and outputs the optical wavelength information with the frame header to the CRC calculating unit 27f.

The CRC calculating unit 27f adds a byte required for a CRC to the optical wavelength information, and outputs the optical wavelength information to the E/O converting unit 23 (step S1206). Specifically, the CRC calculating unit 27f adds a byte required for a CRC to the optical wavelength information received from the optical-wavelength-information extracting unit 27d and the frame-header adding unit 27e, and outputs the optical wavelength information to the E/O converting unit 23.

In this manner, as the processing procedures performed in the wavelength-multiplexing optical transmission system 40 according to the second embodiment, the optical-signal detecting unit 38 detects that an output level of an optical signal is dropped, and the switching unit 67 switches to the side of the optical-wavelength-information transmitting unit 66, and the optical-signal detecting unit 38 detects that an output level of an optical signal reaches a specified value, and then the switching unit 67 switches to the side of the wavelength demultiplexing unit 34. The present invention is not limited to the above processing procedures. As long as the optical-wavelength-information transmitting unit 66 performs the optical-wavelength-information transmitting process, and also as long as the optical-wavelength control unit 57 performs the optical-wavelength control process, other processes can be skipped, or the order of the processing procedures can be changed.

Furthermore, the processing procedures of the optical-wavelength-information transmitting process is explained with reference to FIG. 11. The present invention is not limited to the above processing procedures. As long as optical wavelength information is transmitted to the transponder by outputting the number of optical pulses corresponding to the optical wavelength information, other processes can be skipped, or the order of the processing procedures can be changed. Also, the processing procedures of the optical-wavelength control process is explained with reference to FIG. 12. The present invention is not limited to the above processing procedures. As long as received optical wavelength information is input to the E/O converting unit, other processes can be skipped, or the order of the processing procedures can be changed.

As described above, the wavelength-multiplexing optical transmission system according to the second embodiment includes the transponder that is configured to output an optical signal with a specified optical wavelength, and the wavelength-multiplexing optical transmission apparatus, and the connection cable for connecting the transponder to the wavelength-multiplexing optical transmission apparatus. The wavelength-multiplexing optical transmission apparatus includes the wavelength multiplexing unit that multiplexes optical signals with different optical wavelengths received from the transponder into an optical signal, and the wavelength demultiplexing unit that demultiplexes a multiplexed optical signal by each of optical wavelengths and outputs optical signals with each of the optical wavelength to the transponder. The wavelength-multiplexing optical transmission apparatus stores therein optical wavelength information on an optical wavelength of an optical signal subjected to be output from the transponder, and transmits the stored optical wavelength information to the transponder via the connection cable. The transponder controls an optical wavelength of an optical signal subjected to be input to the wavelength multiplexing unit based on the received optical wavelength information. Therefore, in case the wavelength-multiplexing optical transmission apparatus has a trouble, it is possible to set a specified optical wavelength on the transponder stably. Furthermore, it is also possible to reduce a workload of an operator and errors in operation as compared with a method of setting an optical wavelength on the transponder manually with getting a confirmation. Moreover, when an optical wavelength is properly controlled, the optical-signal detecting unit detects that an output level of an optical signal reaches a specified value, and thus it is possible to confirm that the optical wavelength is properly controlled.

Furthermore, the wavelength-multiplexing optical transmission apparatus according to the second embodiment transmits optical wavelength information to the transponder by outputting the number of optical pulses corresponding to the optical wavelength information. Then, the transponder obtains the received number of the optical pulses, and controls an optical wavelength of an optical signal to correspond to the optical wavelength information corresponding to the number of the optical pulses so that the optical signal with the optical wavelength corresponding to the optical wavelength information can be input to the wavelength multiplexing unit. Therefore, in case the wavelength-multiplexing optical transmission apparatus has a trouble, it is possible to set a specified optical wavelength on the transponder stably. Furthermore, optical wavelength information is transmitted to the transponder by outputting the number of optical pulses corresponding to the optical wavelength information, and thus an optical wavelength can be set on the transponder more simply as compared with the method of transmitting optical wavelength information directly.

As the methods of transmitting optical wavelength information, optical wavelength information is transmitted by being converted into an optical signal with a specified optical wavelength in the wavelength-multiplexing optical transmission system according to the first embodiment, and optical wavelength information is transmitted by outputting the number of optical pulses corresponding to the optical wavelength information in the wavelength-multiplexing optical transmission system according to the second embodiment of the present invention. Alternatively, optical wavelength information can be transmitted by modulating a frequency of an optical signal into a specified frequency corresponding to the optical wavelength information. A wavelength-multiplexing optical transmission system according to a third embodiment of the present invention, that employs the above alternative method, is explained below.

First, an outline of the wavelength-multiplexing optical transmission system according to the third embodiment is described below. The wavelength-multiplexing optical transmission system according to the third embodiment includes, in the same manner as those according to the first and the second embodiments, includes a transponder, a wavelength-multiplexing optical transmission apparatus, and a connection cable. The transponder is configured to output an optical signal with a specified optical wavelength. The wavelength-multiplexing optical transmission apparatus includes a wavelength multiplexing unit, a wavelength demultiplexing unit, an optical-wavelength-information storing unit, a modulation detecting unit, and an optical-wavelength-information transmitting unit. The wavelength multiplexing unit multiplexes optical signals with different optical wavelengths received from the transponder into an optical signal. The wavelength demultiplexing unit demultiplexes a multiplexed optical signal by each of optical wavelengths, and outputs optical signals with each of the optical wavelengths to the transponder. The transponder and the wavelength-multiplexing optical transmission apparatus are connected to each other by the connection cable.

The optical-wavelength-information storing unit stores therein optical wavelength information on an optical wavelength of an optical signal to be output from the transponder.

An optical-wavelength control unit included in the transponder controls an optical wavelength of an optical signal to be input to the wavelength multiplexing unit. Specifically, in the wavelength-multiplexing optical transmission system according to the third embodiment, the optical-wavelength control unit outputs an optical signal with a frequency, which is modulated to correspond to a specified optical wavelength, to the wavelength multiplexing unit. Then, the modulation detecting unit detects the optical signal output from the transponder, and further detects a modulated frequency from the optical signal.

The optical-wavelength-information transmitting unit transmits optical wavelength information stored in the optical-wavelength-information storing unit to the transponder via the connection cable. Specifically, in the wavelength-multiplexing optical transmission system according to the third embodiment, the optical-wavelength-information transmitting unit compares the optical wavelength information stored in the optical-wavelength-information storing unit with optical wavelength information corresponding to the frequency detected by the modulation detecting unit. If these optical wavelength information are matched with each other, the optical-wavelength-information transmitting unit transmits the optical wavelength information to the transponder by emitting a light.

The optical-wavelength control unit controls an optical wavelength of an optical signal to be input to the wavelength multiplexing unit based on the received optical wavelength information. Specifically, when receiving the emitted light, the optical-wavelength control unit recognizes that the optical wavelength information are matched with each other, and stops modulating a frequency.

The optical-wavelength control unit is configured to detect an emitted light in a predetermined period of time. When receiving no emitted light within the predetermined period of time, the optical-wavelength control unit recognizes that the optical wavelength information are not matched with each other, and outputs an optical signal with a frequency, which is modulated to correspond to a subsequent optical wavelength, to the wavelength multiplexing unit. The optical-wavelength control unit continuously performs the above modulating process until the optical-wavelength control unit receives an emitted light from the optical-wavelength-information transmitting unit.

In this manner, in the wavelength-multiplexing optical transmission system according to the third embodiment, even if the wavelength-multiplexing optical transmission apparatus has a trouble, it is possible to set a specified optical wavelength on the transponder stably. Furthermore, optical wavelength information is set by alternately communicating between the transponder and the wavelength-multiplexing optical transmission apparatus, and thus an optical wavelength can be set more reliably as compared with a method of transmitting optical wavelength information from the wavelength-multiplexing optical transmission apparatus to the transponder one-sidedly.

Figure 13:
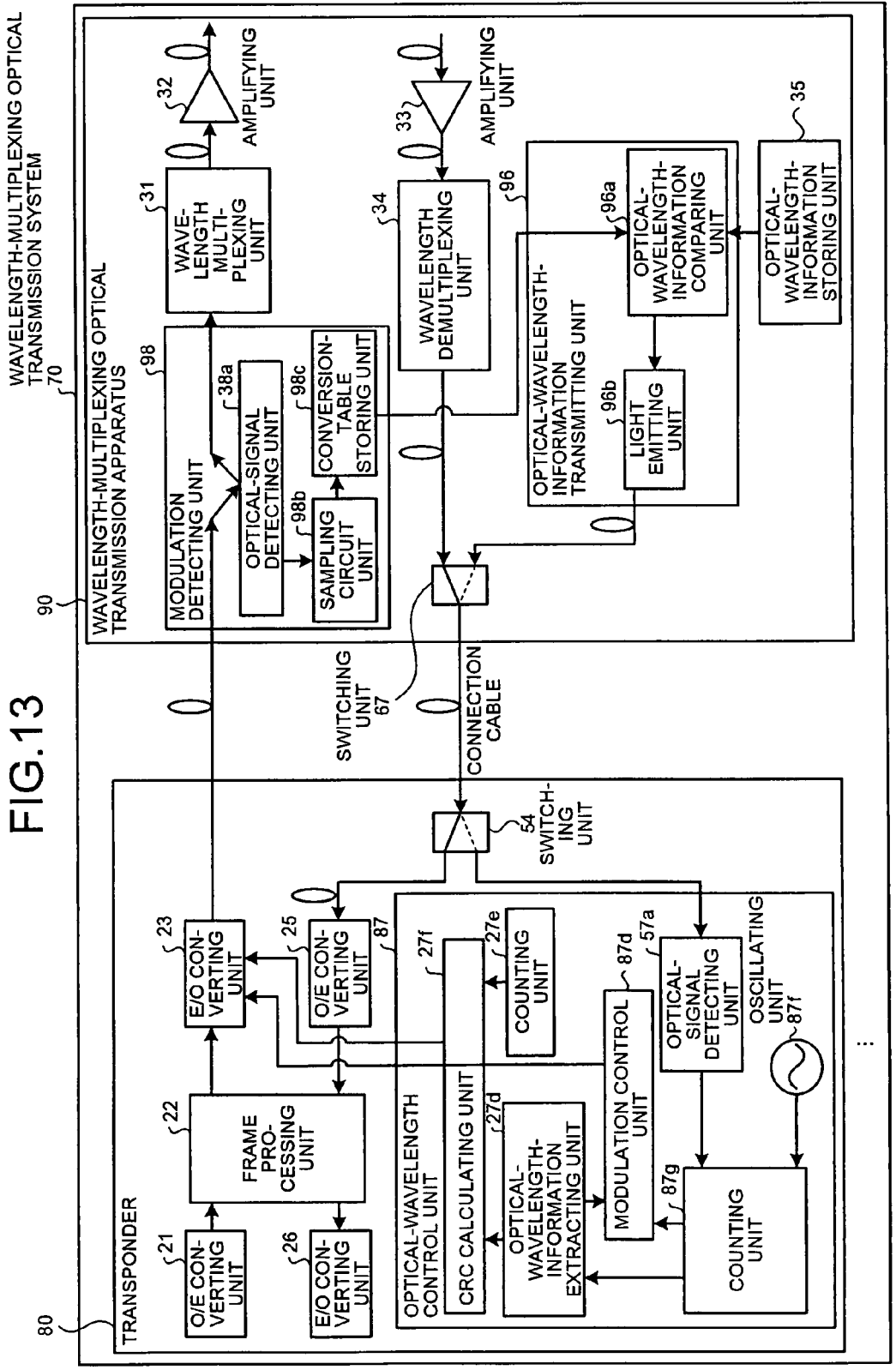
FIG. 13 is a block diagram of a wavelength-multiplexing optical transmission system according to a third embodiment of the present invention.

A configuration of a wavelength-multiplexing optical transmission system 70 according to the third embodiment is described in detail below with reference to FIGS. 13 and 14. FIG. 13 is a block diagram of the wavelength-multiplexing optical transmission system 70.

As shown in FIG. 13, the wavelength-multiplexing optical transmission system 70 includes a transponder 80, a wavelength-multiplexing optical transmission apparatus 90, and a connection cable. The transponder 80 and the wavelength-multiplexing optical transmission apparatus 90 are connected to each other by the connection cable. The portions identical to those in FIGS. 2 and 8 for the wavelength-multiplexing optical transmission systems 10 and 40 according to the first and the second embodiments are denoted with the same reference numerals and the description of those portions is omitted.

The transponder 80 is configured to output an optical signal with a specified optical wavelength. The transponder 80 includes the O/E converting unit 21, the frame processing unit 22, the E/O converting unit 23, the switching unit 54, the O/E converting unit 25, the E/O converting unit 26, and an optical-wavelength control unit 87.

The optical-wavelength control unit 87 controls an optical wavelength of an optical signal subjected to be output to the wavelength multiplexing unit 31 based on received optical wavelength information. The optical-wavelength control unit 87 includes the optical-wavelength-information extracting unit 27d, the frame-header adding unit 27e, the CRC calculating unit 27f, a modulation control unit 87d, the optical-signal detecting unit 57a, an oscillating unit 87f, and a counting unit 87g. The portions identical to those in FIGS. 2 and 8 for the first and the second embodiments are denoted with the same reference numerals and the description of those portions is omitted.

The modulation control unit 87d modulates a frequency of an optical signal into a specified frequency corresponding to optical wavelength information. Specifically, the modulation control unit 87d is connected between the optical-wavelength-information extracting unit 27d and the counting unit 87g, and also connected to the E/O converting unit 23. When receiving optical wavelength information from the optical-wavelength-information extracting unit 27d, the modulation control unit 87d creates a modulation frequency based on a divide clock (CLK) received from the counting unit 87g to modulate a frequency of an optical signal into a frequency corresponding to the received optical wavelength information, and outputs the created modulation frequency to the E/O converting unit 23. Therefore, an optical signal to be output from the E/O converting unit 23 is modulated by the modulation frequency received from the modulation control unit 87d.

The oscillating unit 87f is used to determine a reference time for measurement. Specifically, the oscillating unit 87f is connected to the counting unit 87g. A reference time for measurement is determined by using the oscillating unit 87f, and output to the counting unit 87g. The counting unit 87g counts a time. Specifically, the counting unit 87g is connected to the optical-signal detecting unit 57a, the oscillating unit 87f, the optical-wavelength-information extracting unit 27d, and the modulation control unit 87d. The counting unit 87g measures a predetermined period of time based on the reference time obtained by using the oscillating unit 87f. When the counting unit 87g does not receive any input from the optical-signal detecting unit 57a within the predetermined period of time, the counting unit 87g outputs a signal indicating a time-out to the optical-wavelength-information extracting unit 27d and the modulation control unit 87d.

The wavelength-multiplexing optical transmission apparatus 90 multiplexes optical signals with different wavelengths received from the transponder 80 into an optical signal, or demultiplexes a multiplexed optical signal by each of wavelengths. The wavelength-multiplexing optical transmission apparatus 90 includes the wavelength multiplexing unit 31, the amplifying unit 32, the amplifying unit 33, the wavelength demultiplexing unit 34, the optical-wavelength-information storing unit 35, an optical-wavelength-information transmitting unit 96, the switching unit 67, and a modulation detecting unit 98. The portions identical to those in FIGS. 2 and 8 for the first and the second embodiments are denoted with the same reference numerals and the description of those portions is omitted.

The optical-wavelength-information transmitting unit 96 transmits optical wavelength information stored in the optical-wavelength-information storing unit 35 to the transponder 80 via the connection cable. The optical-wavelength-information transmitting unit 96 includes an optical-wavelength-information comparing unit 96a and a light emitting unit 96b.

The optical-wavelength-information comparing unit 96a compares optical wavelength information stored in the optical-wavelength-information storing unit 35 with optical wavelength information corresponding to a detected frequency. Specifically, the optical-wavelength-information comparing unit 96a is connected to the modulation detecting unit 98, the optical-wavelength-information storing unit 35, and the light emitting unit 96b. When receiving optical wavelength information from both the optical-wavelength-information storing unit 35 and the modulation detecting unit 98, the optical-wavelength-information comparing unit 96a compares these optical wavelength information, and outputs a comparison result to the light emitting unit 96b.

The light emitting unit 96b emits a light if the optical wavelength information are matched with each other. Specifically, the light emitting unit 96b is connected between the optical-wavelength-information comparing unit 96a and the switching unit 67. If the comparison result received from the optical-wavelength-information comparing unit 96a indicates that the stored optical wavelength information is matched with the optical wavelength information corresponding to the detected frequency, the light emitting unit 96b transmits an optical signal to the transponder 80 via the switching unit 67 by emitting a light.

The modulation detecting unit 98 detects an optical signal output from the transponder 80, and further detects a modulated frequency from the optical signal. The modulation detecting unit 98 includes the optical-signal detecting unit 38a, a sampling circuit unit 98b, and a conversion-table storing unit 98c. The portions identical to those in FIG. 2 for the first embodiment are denoted with the same reference numerals and the description of those portions is omitted.

The sampling circuit unit 98b detects a modulation frequency of an optical signal. Specifically, the sampling circuit unit 98b is connected between the optical-signal detecting unit 38a and the conversion-table storing unit 98c. When receiving an optical signal from the optical-signal detecting unit 38a, the sampling circuit unit 98b detects a modulation frequency of the received optical signal, and outputs the detected modulation frequency to the conversion-table storing unit 98c.

The conversion-table storing unit 98c stores therein optical wavelength information and modulation frequencies in associated manner. Specifically, the conversion-table storing unit 98c is connected between the sampling circuit unit 98b and the optical-wavelength-information comparing unit 96a. When receiving a modulation frequency from the sampling circuit unit 98b, the conversion-table storing unit 98c detects optical wavelength information corresponding to the received modulation frequency, and outputs the detected optical wavelength information to the optical-wavelength-information comparing unit 96a. For example, as shown in FIG. 14, the conversion-table storing unit 98c stores therein optical wavelength information "λ1" associated with a modulation frequency "1 Hz", and optical wavelength information "λ2" associated with a modulation frequency "2 Hz".

Figure 15:
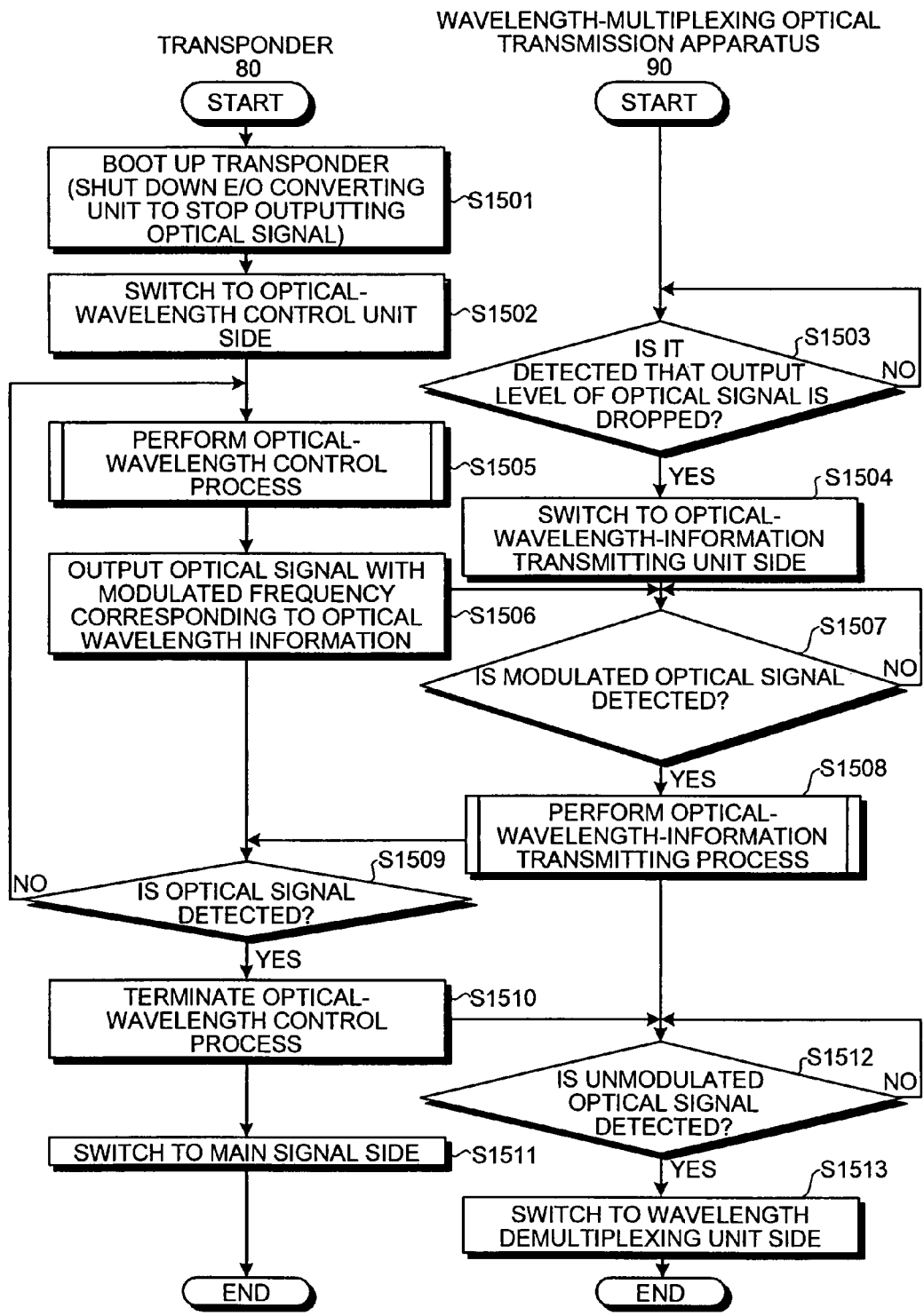
FIG. 15 is a flowchart of processing procedures performed in the wavelength-multiplexing optical transmission system according to the third embodiment.

Processing procedures performed by the transponder 80 and the wavelength-multiplexing optical transmission apparatus 90 in the wavelength-multiplexing optical transmission system 70 is explained in detail below with reference to FIG. 15. FIG. 15 is a flowchart of processing procedures when the wavelength-multiplexing optical transmission system 70 switches from a regular operation mode to an operation mode for setting an optical wavelength on the transponder 80.

The wavelength-multiplexing optical transmission system 70 boots (or reboots) up the transponder 80 (step S1501). Then, the transponder 80 shuts down the E/O converting unit 23 to stop outputting an optical signal. The switching unit 54 switches to the side of the optical-wavelength control unit 87 (step S1502).

At this time, in the wavelength-multiplexing optical transmission apparatus 90, the modulation detecting unit 98 included determines whether it is detected that an output level of an optical signal is dropped (step S1503). If it is not detected that the output level of the optical signal is dropped (i.e., if the wavelength-multiplexing optical transmission system 70 is in the regular operation mode) (NO at step S1503), the process control repeats step S1503 until it is detected that the output level of the optical signal is dropped.

If it is detected that the output level of the optical signal is dropped (YES-at step S1503), the switching unit 67 switches to the side of the optical-wavelength-information transmitting unit 96 (step S1504).

On the other hand, in the transponder 80, the optical-wavelength control unit 87 performs an optical-wavelength control process (step S1505). Specifically, the optical-wavelength control unit 87 controls an optical wavelength of an optical signal so that an optical signal with a modulation frequency (for example, at 1 Hz) corresponding to optical wavelength information (for example, λ1) can be input to the wavelength multiplexing unit 31.

Then, the E/O converting unit 23 outputs the optical signal with the modulation frequency corresponding to the optical wavelength information (step S1506).

On the other hand, in the wavelength-multiplexing optical transmission apparatus 90, after the switching unit 67 switches to the side of the optical-wavelength-information transmitting unit 96, the modulation detecting unit 98 determines whether any modulated optical signal is detected (step S1507). If any modulated optical signal is not detected (NO at step S1507), the process control repeats step S1507 until a modulated optical signal is detected.

If a modulated optical signal is detected (YES at step S1507), the optical-wavelength-information transmitting unit 96 performs an optical-wavelength-information transmitting process (step S1508). Specifically, the optical-wavelength-information transmitting unit 96 compares optical wavelength information stored in the optical-wavelength-information storing unit 35 with optical wavelength information corresponding to the frequency detected by the modulation detecting unit 98. If these optical wavelength information are matched with each other, the optical-wavelength-information transmitting unit 96 transmits the optical wavelength information by emitting a light.

On the other hand, in the transponder 80, after the E/O converting unit 23 outputs the optical signal with the modulation frequency, the optical-wavelength control unit 87 determines whether an optical signal is detected (step S1509). The optical-wavelength control unit 87 repeatedly performs the determination at regular intervals. If any optical signal is not detected within each of the intervals (NO at step S1509), the process control returns to step S1505. Specifically, the optical-wavelength control unit 87 controls an optical wavelength of an optical signal so that an optical signal with a modulation frequency (for example, at 2 Hz) corresponding to optical wavelength information (for example, λ2) can be input to the wavelength multiplexing unit 31.

If an optical signal is detected (YES at step S1509), the optical-wavelength control unit 87 terminates the optical-wavelength control process (step S1510). Specifically, the optical-wavelength control unit 87 stops modulating a frequency of an optical signal into a specified frequency (for example, at 1 Hz) corresponding to optical wavelength information (for example, λ1).

On the other hand, in the wavelength-multiplexing optical transmission apparatus 90, after the optical-wavelength-information transmitting process is performed, the modulation detecting unit 98 determines whether any unmodulated optical signal is detected (step S1512). If any unmodulated optical signal is not detected (NO at step S1512), the process control repeats step S1512 until an unmodulated optical signal is detected.

If an unmodulated optical signal is detected (YES at step S1512), the switching unit 67 switches to the side of the wavelength demultiplexing unit 34 (step S1513).

In this manner, in the wavelength-multiplexing optical transmission system 70 according to the third embodiment, even if the wavelength-multiplexing optical transmission apparatus 90 has a trouble, it is possible to set a specified optical wavelength on the transponder 80 stably. Furthermore, optical wavelength information is set by alternately communicating between the transponder and the wavelength-multiplexing optical transmission apparatus, and thus an optical wavelength can be set more reliably as compared with a method of transmitting optical wavelength information from the wavelength-multiplexing optical transmission apparatus to the transponder one-sidedly.

Figure 16:
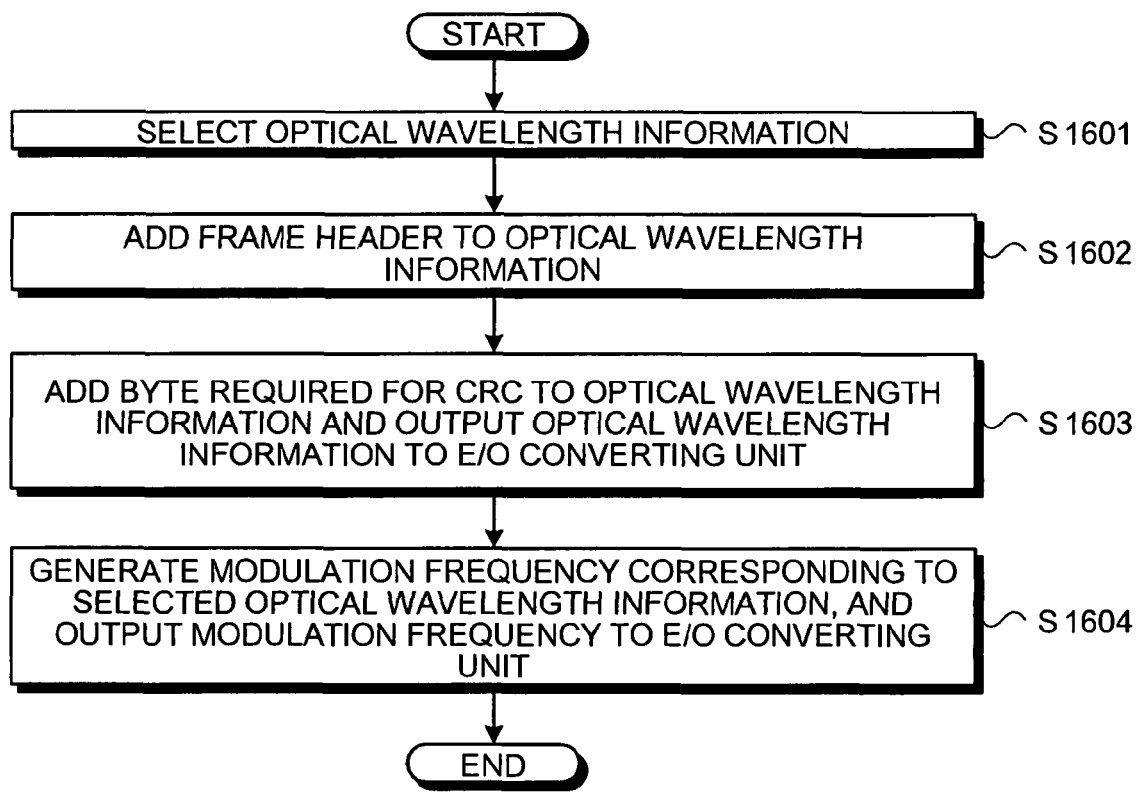
FIG. 16 is a flowchart of an optical-wavelength control process performed by a transponder shown in FIG. 13.

The optical-wavelength control process, which is performed by the optical-wavelength control unit 87 at step S1505 shown in FIG. 15, is explained in detail below with reference to FIG. 16.

The optical-wavelength-information extracting unit 27*d* selects optical wavelength information (step S1601). Specifically, the optical-wavelength-information extracting unit 27*d* selects, for example, the shortest wavelength "λ1", and outputs the shortest wavelength "λ1" to both the CRC calculating unit 27*f* and the modulation control unit 87*d*.

The frame-header adding unit 27*e* adds a frame header to the optical wavelength information (step S1602). Specifically, the frame-header adding unit 27*e* creates a frame header for the optical wavelength information received from the optical-wavelength-information extracting unit 27*d*, and adds the created frame header to the optical wavelength information, and then outputs the optical wavelength information with the frame header to the CRC calculating unit 27*f*.

The CRC calculating unit 27*f* adds a byte required for a CRC to the optical wavelength information, and outputs the optical wavelength information to the E/O converting unit 23 (step S1603). Specifically, the CRC calculating unit 27*f* adds a byte required for a CRC to the optical wavelength information received from the optical-wavelength-information extracting unit 27*d* and the frame-header adding unit 27*e*, and outputs the optical wavelength information to the E/O converting unit 23.

Then, the modulation control unit 87*d* generates a modulation frequency corresponding to the selected optical wavelength information, and outputs the generated modulation frequency to the E/O converting unit 23 (step S1604). Specifically, the modulation control unit 87*d* generates a modulation frequency corresponding to the optical wavelength information received from the optical-wavelength-information extracting unit 27*d*, and outputs the generated modulation frequency to the E/O converting unit 23.

Figure 17:
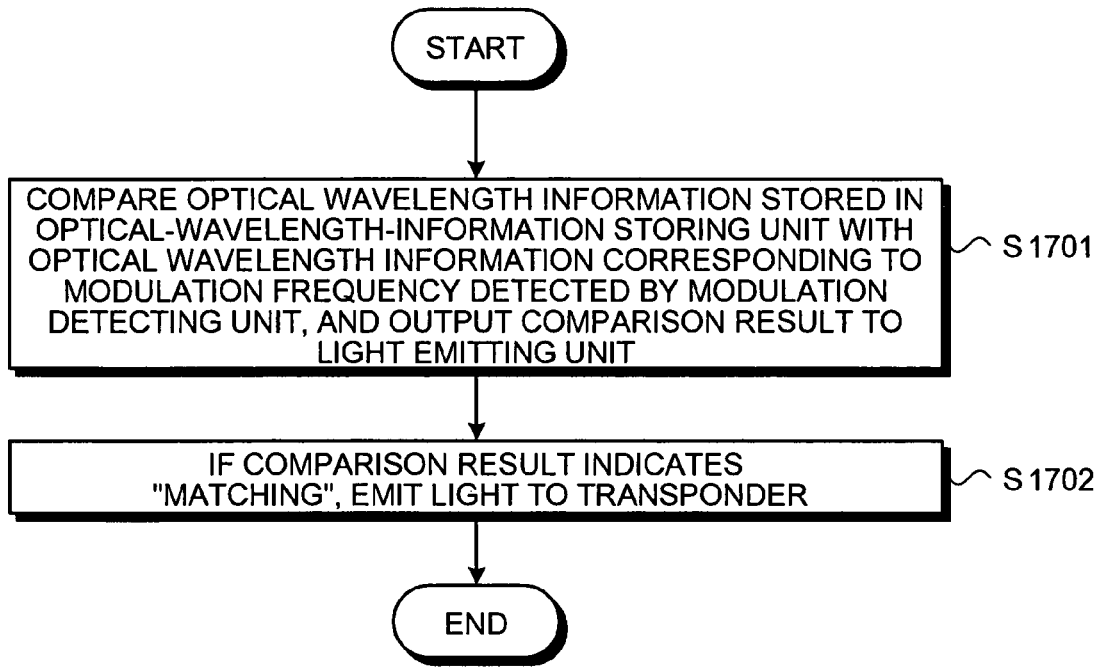
FIG. 17 is a flowchart of an optical-wavelength-information transmitting process performed by a wavelength-multiplexing optical transmission apparatus shown in FIG. 13.
Figure 18:
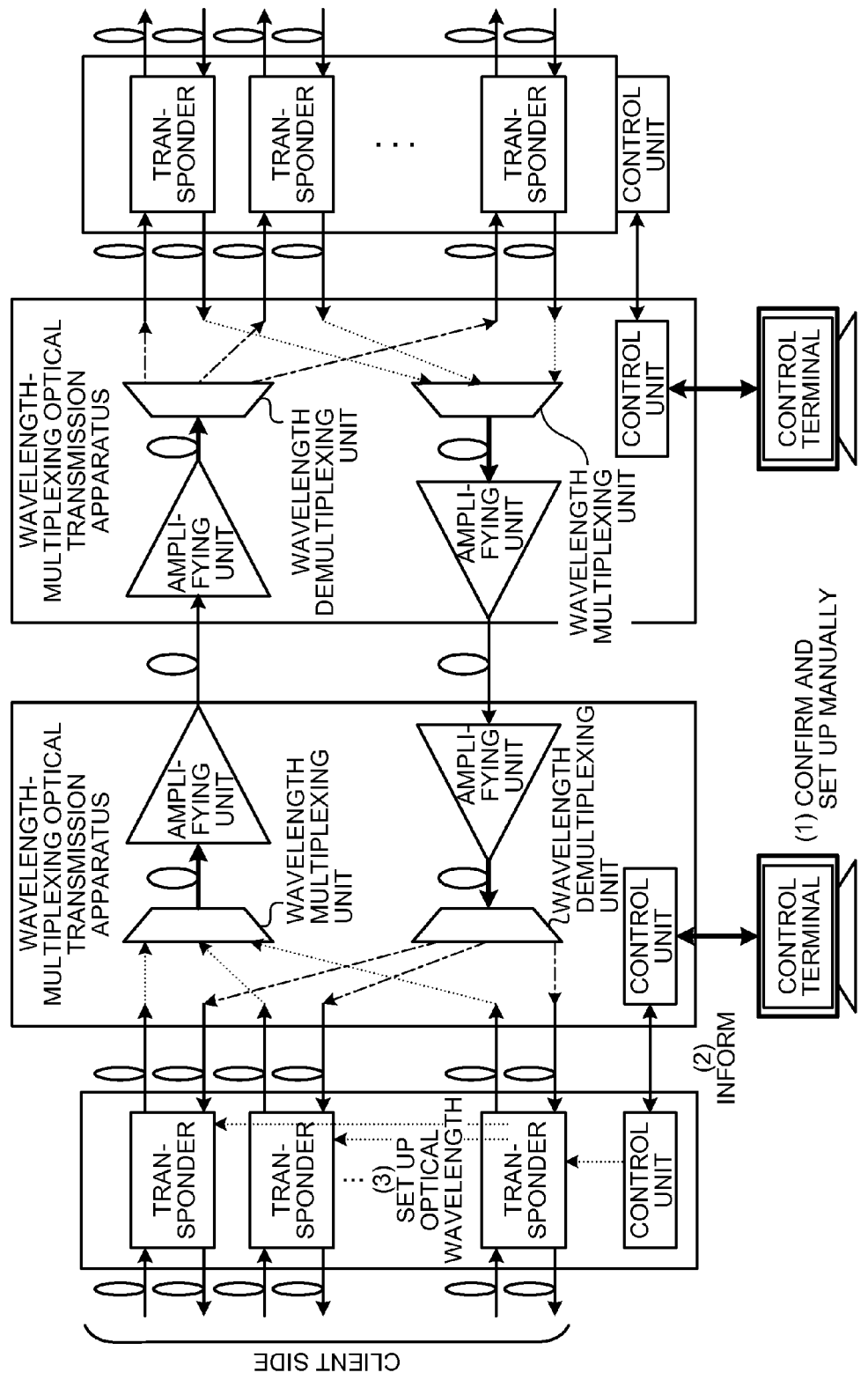
FIG. 18 is a block diagram of an example of a wavelength-multiplexing optical transmission system according to a conventional technology.
Figure 19:
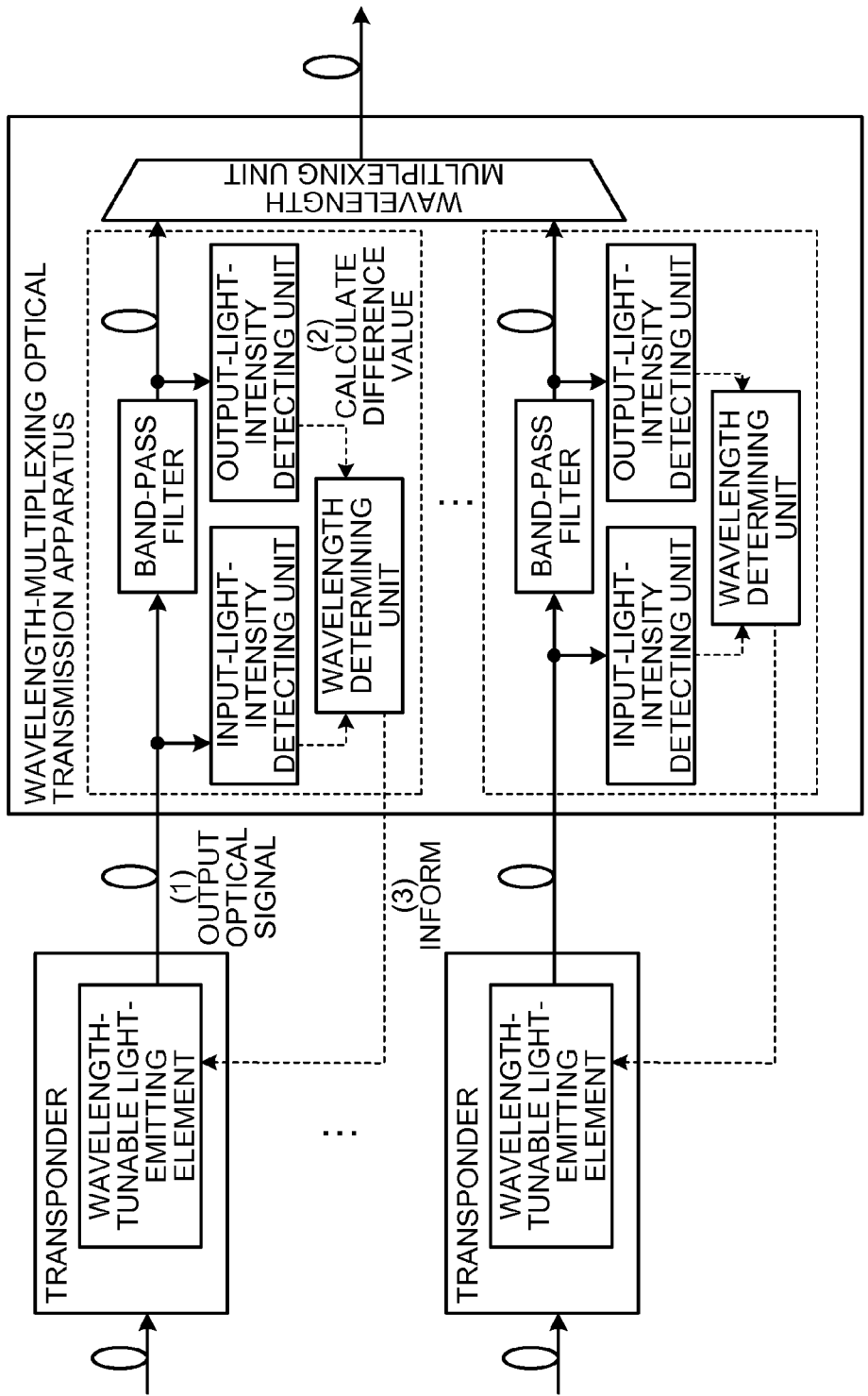
FIG. 19 is a block diagram of another example of a wavelength-multiplexing optical transmission system according to the conventional technology.
Figure 20:
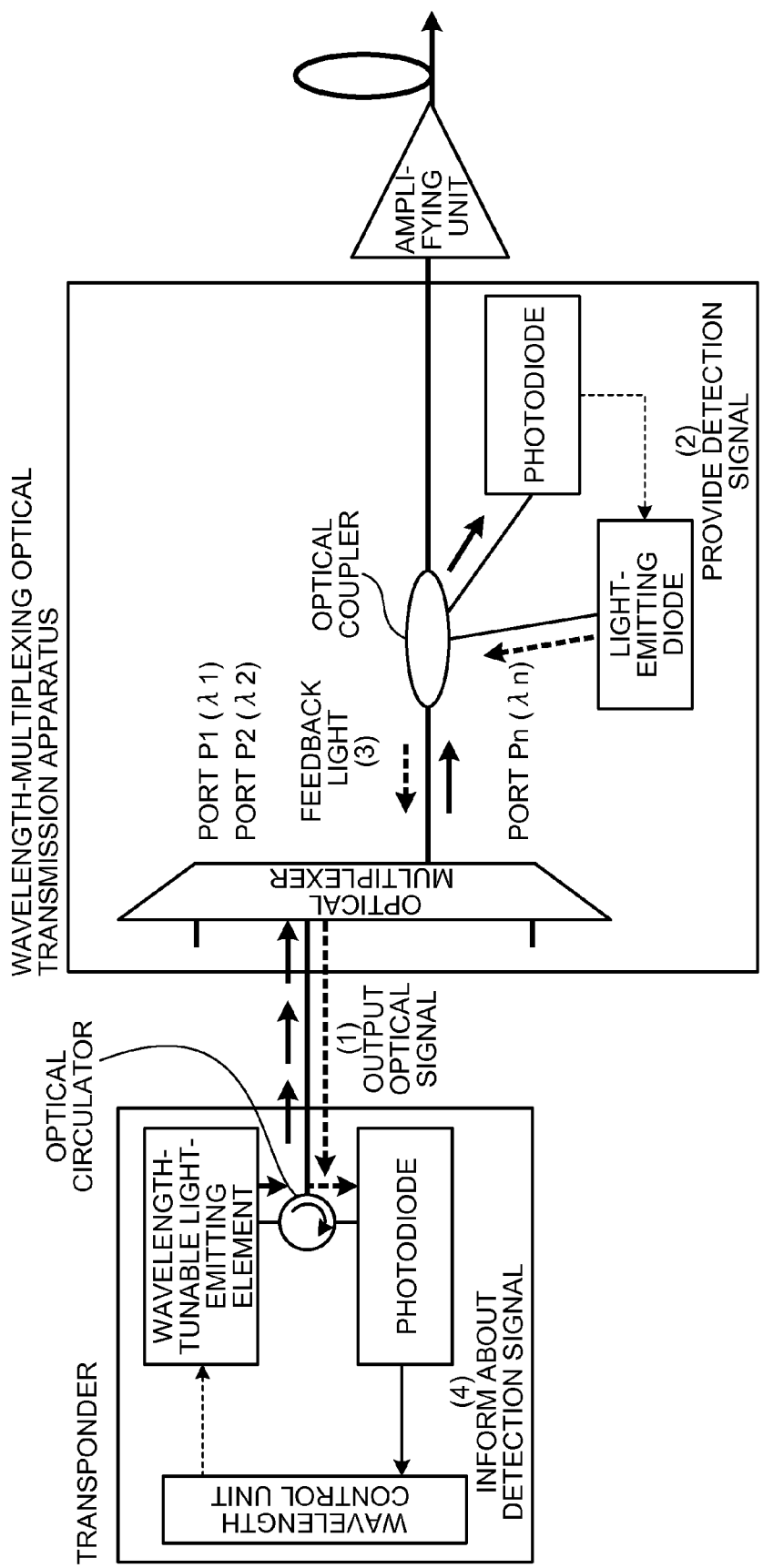
FIG. 20 is a block diagram of still another example of a wavelength-multiplexing optical transmission system according to the conventional technology.

The optical-wavelength-information transmitting process, which is performed by the optical-wavelength-information transmitting unit 96 at step S1508 shown in FIG. 15, is explained in detail below with reference to FIG. 17.

In the wavelength-multiplexing optical transmission apparatus 90 according to the third embodiment, the optical-wavelength-information comparing unit 96*a* compares optical wavelength information stored in the optical-wavelength-information storing unit 35 with optical wavelength information corresponding to a frequency detected by the modulation detecting unit 98, and outputs a comparison result to the light emitting unit 96*b* (step S1701). Specifically, the optical-wavelength-information comparing unit 96*a* compares optical wavelength information received from the optical-wavelength-information storing unit 35 with optical wavelength information received from the conversion-table storing unit 98*c*, and outputs a comparison result to the light emitting unit 96*b*.

If the comparison result received from the optical-wavelength-information comparing unit 96*a* indicates "matching", the light emitting unit 96*b* emits a light to the transponder 80 (step S1702).

In this manner, as the processing procedures performed in the wavelength-multiplexing optical transmission system 70 according to the third embodiment, the optical-signal detecting unit 38*a* detects that an output level of an optical signal is dropped, and the switching unit 67 switches to the side of the optical-wavelength-information transmitting unit 96. The present invention is not limited to the above processing procedures. As long as the optical-wavelength-information transmitting unit 96 performs the optical-wavelength-information transmitting process, and the modulation detecting unit 98 performs the modulation detecting process, and also the optical-wavelength control unit 87 performs the optical-wavelength control process, other processes can be skipped or the order of the processing procedures can be changed.

Furthermore, the processing procedures of the optical-wavelength control process is explained with reference to FIG. 16. The present invention is not limited to the above processing procedures. As long as an optical signal with a modulation frequency corresponding to optical wavelength information is input to the wavelength multiplexing unit, and the modulation process is terminated when an emitted light is received, other processes can be skipped, or the order of processing procedures can be changed. Moreover, the processing procedures of the optical-wavelength-information transmitting process is explained with reference to FIG. 17. The present invention is not limited to the above processing procedures. As long as stored optical wavelength information is compared with detected optical wavelength information, and the optical wavelength information is transmitted to the transponder by emitting a light if these optical wavelength information are matched with each other, other processes can be skipped, or the order of processing procedures can be changed.

As described above, the wavelength-multiplexing optical transmission system according to the third embodiment includes the transponder that is configured to output an optical signal with a specified optical wavelength, and the wavelength-multiplexing optical transmission apparatus, and the connection cable for connecting the transponder to the wavelength-multiplexing optical transmission apparatus. The wavelength-multiplexing optical transmission apparatus includes the wavelength multiplexing unit that multiplexes optical signals with different optical wavelengths received from the transponder into an optical signal, and the wavelength demultiplexing unit that demultiplexes a multiplexed optical signal by each of optical wavelengths and outputs optical signals with each of the optical wavelengths to the transponder. The wavelength-multiplexing optical transmission apparatus stores therein optical wavelength information on an optical wavelength of an optical signal subjected to be output from the transponder, and transmits the stored optical wavelength information to the transponder via the connection cable. The transponder controls an optical wavelength of an optical signal subjected to be input to the wavelength multiplexing unit based on the received optical wavelength information. Therefore, in case the wavelength-multiplexing optical transmission apparatus has a trouble, it is possible to set a specified optical wavelength on the transponder stably. Furthermore, it is also possible to reduce a workload of an operator and errors in operation as compared with a method of setting an optical wavelength on the transponder manually with getting a confirmation. Moreover, when an optical wavelength is properly controlled, the optical-signal detecting unit detects that an output level of an optical signal reaches a specified value, and thus it is possible to confirm that the optical wavelength is properly controlled.

Furthermore, the wavelength-multiplexing optical transmission apparatus according to the third embodiment detects an optical signal received from the transponder, and further detects a modulation frequency from the optical signal, and compares the stored optical wavelength information with optical wavelength information corresponding to the detected modulation frequency, and transmits, if the optical wavelength information are matched with each other, the optical wavelength information to the transponder by emitting a light. Then, the transponder outputs an optical signal with a modulation frequency corresponding to specified optical wavelength information to the wavelength multiplexing unit, and stops modulating a frequency when receiving the emitted light from the wavelength-multiplexing optical transmission apparatus. Therefore, in case the wavelength-multiplexing optical transmission apparatus has a trouble, it is possible to set a specified optical wavelength on the transponder stably. Furthermore, optical wavelength information is set by alternately communicating between the transponder and the wavelength-multiplexing optical transmission apparatus, and thus an optical wavelength can be set more reliably as compared with a method of transmitting optical wavelength information from the wavelength-multiplexing optical transmission apparatus to the transponder one-sidedly.

A wavelength-multiplexing optical transmission system according to a fourth embodiment of the present invention is explained below.

In the wavelength-multiplexing optical transmission systems according to the first to third embodiments, there are explained about cases in which the wavelength-multiplexing optical transmission apparatus stores therein optical wavelength information in advance (for example, optical wavelength information is preliminarily set on the wavelength-multiplexing optical transmission apparatus at the time of producing the wavelength-multiplexing optical transmission apparatus). Alternatively, for example, a network management apparatus for managing the wavelength-multiplexing optical transmission system can transmit optical wavelength information to the wavelength-multiplexing optical transmission apparatus at the time of switching to a mode for setting an optical wavelength on the transponder, and then the optical wavelength information is stored in the wavelength-multiplexing optical transmission apparatus. As long as the wavelength-multiplexing optical transmission apparatus can store therein optical wavelength information at the time of setting an optical wavelength on the transponder, the wavelength-multiplexing optical transmission apparatus needs not preliminarily store therein optical wavelength information.

As the methods of transmitting optical wavelength information, optical wavelength information is transmitted by being converted into an optical signal with a specified optical wavelength in the wavelength-multiplexing optical transmission system according to the first embodiment, and optical wavelength information is transmitted by outputting the number of optical pulses corresponding to the optical wavelength information in the wavelength-multiplexing optical transmission system according to the second embodiment, and also optical wavelength information is transmitted by modulating a frequency of an optical signal into a modulation frequency corresponding to specified optical wavelength information in the wavelength-multiplexing optical transmission system according to the third embodiment. The present invention is not limited to the above methods, but can be applied to any other methods as long as the wavelength-multiplexing optical transmission apparatus stores therein optical wavelength information, and the stored optical wavelength information is transmitted to the transponder via the connection cable, and then the transponder controls an optical wavelength of an optical signal to be input to the wavelength multiplexing unit.

Furthermore, a plurality of the transponders can be included in the wavelength-multiplexing optical transmission systems according to the first to third embodiments. The present invention is not limited to the number of the transponders. Therefore, the present invention can be applied to the wavelength-multiplexing optical transmission system including one or more transponders.

Moreover, the wavelength-multiplexing optical transmission system including the tunable transponder capable of tuning an optical wavelength is explained in the first to third embodiments. The present invention is not limited to the above system. The present invention can be applied to a wavelength-multiplexing optical transmission system including a transponder incapable of tuning an optical wavelength and a wavelength-multiplexing optical transmission system including a-transponder capable of neither tuning an optical wavelength nor tuning a fixed wavelength.

Furthermore, the automatically-performed processes (such as the detecting process performed by the optical-signal detecting unit in the wavelength-multiplexing optical transmission apparatus according to the first or second embodiment) can be fully or partially performed manually. On the contrary, the manually-performed processes (such as the transponder booting) can be fully or partially performed automatically by using the well-known method. For example, it is possible to boot the network management apparatus for managing the wavelength-multiplexing optical transmission system automatically on a regular basis. In addition, it is also possible to change the processing procedures, the controlling procedures, specific names of elements, information including data or parameters, and the like, those described in the above specification or drawings, if not otherwise specified.

Moreover, each of elements (such as the elements shown in FIGS. 2, 8, and 13) is conceptually depicted in the drawings, so that the elements need not be physically located as shown in the drawings. Therefore, each of the elements can be fully or partially dispersed or integrated functionally or physically depending on loads or usage statuses in any unit. Moreover, each of processing functions can be fully or partially established by a central processing unit (CPU) or a computer program to be executed by the CPU, or established as a hardware with a wired logic.

As described above, according to an aspect of the present invention, in case the wavelength-multiplexing optical transmission apparatus has a trouble, it is possible to set a specified optical wavelength on the transponder stably.

Furthermore, according to another aspect of the present invention, in case the wavelength-multiplexing optical transmission apparatus has a trouble, it is possible to set a specified optical wavelength on the transponder stably. Furthermore, optical wavelength information is directly transmitted to the transponder, and thus an optical wavelength can be set on the transponder more precisely as compared with a method of transmitting optical wavelength information by outputting the number of optical pulses corresponding to the optical wavelength information.

Moreover, according to still another aspect of the present invention, in case the wavelength-multiplexing optical transmission apparatus has a trouble, it is possible to set a specified optical wavelength on the transponder stably. Furthermore, optical wavelength information is transmitted to the transponder by outputting the number of optical pulses corresponding to the optical wavelength information, and thus an optical wavelength can be set on the transponder more simply as compared with the method of transmitting optical wavelength information directly.

Furthermore, according to still another aspect of the present invention, in case the wavelength-multiplexing optical transmission apparatus has a trouble, it is possible to set a specified optical wavelength on the transponder stably. Furthermore, optical wavelength information is set by alternately communicating between the transponder and the wavelength-multiplexing optical transmission apparatus, and thus an optical wavelength can be set more reliably as compared with a method of transmitting optical wavelength information from the wavelength-multiplexing optical transmission apparatus to the transponder one-sidedly.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wavelength-multiplexing optical transmission system comprising:
   a transponder that outputs an optical signal with a predetermined optical wavelength;
   a wavelength-multiplexing optical transmission apparatus including
      a wavelength multiplexing unit that multiplexes wavelengths of optical signals input from the transponder into an optical signal, and
      a wavelength demultiplexing unit that demultiplexes wavelengths of a multiplexed optical signal and outputs demultiplexed optical signals to the transponder; and
   a connection cable for connecting the transponder and the wavelength-multiplexing optical transmission apparatus, wherein
   the wavelength-multiplexing optical transmission apparatus further includes
      a detecting unit that determines whether an optical level of one of the optical signals input from the transponder reaches a predetermined value or not;
      an optical-wavelength-information storing unit that stores therein optical wavelength information on an optical wavelength of an optical signal to be output from the transponder, and
      an optical-wavelength-information transmitting unit that transmits the optical wavelength information stored in the optical-wavelength-information storing unit to the transponder via the connection cable, when the detecting unit determines that the optical level of one of the optical signals input from the transponder does not reach the predetermined value, and
   the transponder includes an optical-wavelength control unit that controls an optical wavelength of an optical signal to be input to the wavelength multiplexing unit based on the optical wavelength information received from the optical-wavelength-information transmitting unit.

2. The wavelength-multiplexing optical transmission system according to claim 1, wherein
   the optical-wavelength-information transmitting unit converts the optical wavelength information into an optical signal with a predetermined optical wavelength, and transmits the optical signal to the transponder, and
   the optical-wavelength control unit extracts the optical wavelength information from the optical signal received from the optical-wavelength-information transmitting unit, and controls the optical wavelength of the optical signal in such a manner that an optical signal with an optical wavelength corresponding to extracted optical wavelength information is input to the wavelength multiplexing unit.

3. The wavelength-multiplexing optical transmission system according to claim 1, wherein
   the optical-wavelength-information transmitting unit transmits the optical wavelength information to the transponder by emitting number of optical pulses associated with the optical wavelength information, and
   the optical-wavelength control unit obtains the number of the optical pulses received from the optical-wavelength-information transmitting unit, and controls an optical wavelength of an optical signal in such a manner that an optical signal with an optical wavelength corresponding to the optical wavelength information is input to the wavelength multiplexing unit.

4. The wavelength-multiplexing optical transmission system according to claim 1, wherein
   the wavelength-multiplexing optical transmission apparatus further includes a modulation detecting unit that detects an optical signal input from the transponder and a modulation frequency from the optical signal,
   the optical-wavelength-information transmitting unit compares the optical wavelength information stored in the optical-wavelength-information storing unit with optical wavelength information corresponding to the modulation frequency detected by the modulation detecting unit, and transmits, if the pieces of optical wavelength information are matched with each other, the optical wavelength information to the transponder by emitting a light, and the optical-wavelength control unit modulates a frequency of an optical signal into a modulation frequency corresponding to predetermined optical wavelength information, and outputs the optical signal with the modulation frequency to the wavelength multiplexing unit, and stops modulating a frequency of an optical signal upon receiving the light emitted from the optical-wavelength-information transmitting unit.

5. A wavelength-multiplexing optical transmission method comprising:

demultiplexing wavelengths of a multiplexed optical signal;

transmitting to a transponder that outputs an optical signal a demultiplexed optical signal;

determining whether an optical level of the optical signal output from the transponder reaches a predetermined value or not;

transmitting optical wavelength information on an optical wavelength of an optical signal to be output from the transponder, when the determining determines that the optical level of the optical signal output from the transponder does not reach the predetermined value;

controlling the optical wavelength of the optical signal to be output from the transponder based on the optical wavelength information transmitted at the transmitting; and multiplexing the wavelength of the optical signal controlled at the controlling into an optical signal to be demultiplexed.

\* \* \* \* \*